United States Patent [19]
Pedersen

[11] 3,812,294
[45] May 21, 1974

[54] BILATERAL TIME DIVISION MULTIPLEX SWITCHING SYSTEM

[75] Inventor: Thomas Josef Pedersen, Lincroft, N.J.

[73] Assignee: Bell Telephone Laboratories, Incorporated, Murray Hill, N.J.

[22] Filed: Dec. 22, 1972

[21] Appl. No.: 317,657

[52] U.S. Cl. .......................... 179/15 AQ, 179/15 A
[51] Int. Cl. ............................................ H04j 3/16
[58] Field of Search ...... 179/15 AQ, 15 AT, 18 GF, 179/18 J; 340/166 R, 173 FF, 173 SP

[56] References Cited
UNITED STATES PATENTS
3,573,381 4/1971 Marcus .......................... 179/15 AQ

*Primary Examiner*—William C. Cooper
*Assistant Examiner*—Joseph A. Popek
*Attorney, Agent, or Firm*—W. Ryan

[57] ABSTRACT

A switching network comprising arrays of bilateral crosspoint stores is combined with a plurality of bilateral time slot interchangers connected in links between switching stages to form a complete switching system. The two connections required for a two-way communication are established through bilateral crosspoint stores and a bilateral time slot interchanger which are common to both connections, thereby eliminating hardware redundancy. The system is controlled by information stored in local control memories and associated auxiliary control memories. Call setup and release is implemented by means of pulse stuffing and pulse absorbing at registers in the crosspoint stores and time slot interchangers, and proceeds at all stages simultaneously instead of by propagating stage-by-stage through the network.

17 Claims, 23 Drawing Figures

FIG. 17

| OPERATION | A-CLOCK INTERRUPT | C-CLOCK INTERRUPT | NORMAL/ EXTEND | $T_0$ | CM/ACM | CM WRITE | RESET |
|---|---|---|---|---|---|---|---|
| NORMAL | $\tau_1, \tau_2$ | $\tau_1, \tau_2$ | TRUE (NORMAL) | FALSE | TRUE (CM) | FALSE | FALSE |
| **ACTIVE CALL SETUP** | | | | | | | |
| CA=000 | $\tau_1, \tau_2$ | $\tau_1, \tau_2$ | TRUE | FALSE | TRUE | FALSE | FALSE |
| CA=101 | $\tau_1, \tau_2$ | $\tau_1, \tau_2$ | FOLLOWS ACM STATUS BIT | FALSE | FALSE (ACM) | FALSE | FALSE |
| CA=110 | $\tau_1, \tau_2$ | $\tau_1, \tau_2$ | | FALSE | FALSE | FALSE | FALSE |
| CA=100 | $\tau_1, \tau_2$ | $\tau_1, \tau_2$ | TRUE | FALSE | FALSE | FALSE | FALSE |
| CA=111 | $\tau_1, \tau_2$ | $\tau_1, \tau_2$ | TRUE | FALSE | FALSE | TRUE | FALSE |
| CA=011 | $\tau_1, \tau_2$ | $\tau_1, \tau_2$ | TRUE | FALSE | TRUE | FALSE | TRUE |
| **CALL RELEASE** | | | | | | | |
| CA=000 | $\tau_1, \tau_2$ | $\tau_1, \tau_2$ | TRUE | FALSE | TRUE | FALSE | FALSE |
| CA=101 | $\tau_1$ | $\tau_1, \tau_2$ | FOLLOWS ACM STATUS BIT | TRUE ONLY IN $\tau_2$ | FALSE | FALSE | FALSE |
| CA=110 | $\tau_1$ | $\tau_1, \tau_2$ | | | FALSE | FALSE | FALSE |
| CA=100 | $\tau_1, \tau_2$ | $\tau_1, \tau_2$ | TRUE | FALSE | FALSE | FALSE | FALSE |
| CA=111 | $\tau_1, \tau_2$ | $\tau_1, \tau_2$ | TRUE | FALSE | FALSE | TRUE | FALSE |
| CA=011 | $\tau_1, \tau_2$ | $\tau_1, \tau_2$ | TRUE | FALSE | TRUE | FALSE | TRUE |

FIG. 18

| OPERATION | A-CLOCK INTERRUPT | B-CLOCK INTERRUPT | C-CLOCK INTERRUPT | NORMAL/ EXTEND | $T_0$ | CM/ACM | CM WRITE | RESET |
|---|---|---|---|---|---|---|---|---|
| NORMAL | $\tau_1, \tau_2$ | $\tau_1, \tau_2$ | $\tau_1, \tau_2$ | TRUE (NORMAL) | FALSE | TRUE (CM) | FALSE | FALSE |
| **ACTIVE CALL SETUP** | | | | | | | | |
| CA=000 | $\tau_1, \tau_2$ | $\tau_1, \tau_2$ | $\tau_1, \tau_2$ | TRUE | FALSE | TRUE | FALSE | FALSE |
| CA=101 | $\tau_1, \tau_2$ | $\tau_1, \tau_2$ AS2 | $\tau_1, \tau_2$ | FOLLOWS ACM STATUS BIT | FALSE | FALSE (ACM) | FALSE | FALSE |
| CA=110 | $\tau_1, \tau_2$ | $\tau_1, \tau_2$ | $\tau_1, \tau_2$ | | FALSE | FALSE | FALSE | FALSE |
| CA=100 | $\tau_1, \tau_2$ | $\tau_1, \tau_2$ | $\tau_1, \tau_2$ | TRUE | FALSE | FALSE | FALSE | FALSE |
| CA=111 | $\tau_1, \tau_2$ | $\tau_1, \tau_2$ | $\tau_1, \tau_2$ | TRUE | FALSE | FALSE | TRUE | FALSE |
| CA=011 | $\tau_1, \tau_2$ | $\tau_1, \tau_2$ | $\tau_1, \tau_2$ | TRUE | FALSE | TRUE | FALSE | TRUE |
| **CALL RELEASE** | | | | | | | | |
| CA=000 | $\tau_1, \tau_2$ | $\tau_1, \tau_2$ | $\tau_1, \tau_2$ | TRUE | FALSE | TRUE | FALSE | FALSE |
| CA=101 | $\tau_1$ AS2 | $\tau_1, \tau_2$ | $\tau_1, \tau_2$ AS2 | FOLLOWS ACM STATUS BIT | TRUE ONLY IN $\tau_2$ | FALSE | FALSE | FALSE |
| CA=110 | $\tau_1$ | $\tau_1, \tau_2$ | $\tau_1, \tau_2$ | | | FALSE | FALSE | FALSE |
| CA=100 | $\tau_1, \tau_2$ | $\tau_1, \tau_2$ | $\tau_1, \tau_2$ | TRUE | FALSE | FALSE | FALSE | FALSE |
| CA=111 | $\tau_1, \tau_2$ | $\tau_1, \tau_2$ | $\tau_1, \tau_2$ | TRUE | FALSE | FALSE | TRUE | FALSE |
| CA=011 | $\tau_1, \tau_2$ | $\tau_1, \tau_2$ | $\tau_1, \tau_2$ | TRUE | FALSE | TRUE | FALSE | TRUE |

FIG. 20

| OPERATION | A1-CLOCK INTERRUPT | A2-CLOCK INTERRUPT | A3-CLOCK INTERRUPT | B1-CLOCK INTERRUPT | B2-CLOCK INTERRUPT | NORMAL/ EXTEND 1 | NORMAL/ EXTEND 2 | CM/ACM | CM WRITE | RESET |
|---|---|---|---|---|---|---|---|---|---|---|
| NORMAL | $T_1, T_2$ | $T_2$ | $T_1, T_2$ | $T_1, T_2$ | $T_1, T_2$ | TRUE (NORMAL) | TRUE (NORMAL) | TRUE (CM) | FALSE | FALSE |

ACTIVE CALL SETUP

| | | | | | | | | | | |
|---|---|---|---|---|---|---|---|---|---|---|
| CA'=000 | $T_1, T_2$ | $T_2$ | $T_1, T_2$ | $T_1, T_2$ | $T_1, T_2$ | TRUE | TRUE | TRUE | FALSE | FALSE |
| CA'=001 | $T_1, T_2$ | $T_2$ | $T_1, T_2$ | $T_1, T_2$ | $T_1, T_2$ | FOLLOWS FIRST ACM STATUS BIT | FOLLOWS SECOND ACM STATUS BIT | TRUE | FALSE | FALSE |
| CA'=110 | $T_1, T_2$ | $T_2$ | $T_1, T_2$ | $T_1, T_2$ | $T_1, T_2$ | | | FALSE (ACM) | FALSE | FALSE |
| CA'=100 | $T_1, T_2$ | $T_2$ | $T_1, T_2$ | $T_1, T_2$ | $T_1, T_2$ | TRUE | TRUE | FALSE | FALSE | FALSE |
| CA'=111 | $T_1, T_2$ | $T_2$ | $T_1, T_2$ | $T_1, T_2$ | $T_1, T_2$ | TRUE | TRUE | FALSE | TRUE | FALSE |
| CA'=011 | $T_1, T_2$ | $T_2$ | $T_1, T_2$ | $T_1, T_2$ | $T_1, T_2$ | TRUE | TRUE | TRUE | FALSE | TRUE |

CALL RELEASE

| | | | | | | | | | | |
|---|---|---|---|---|---|---|---|---|---|---|
| CA'=000 | $T_1, T_2$ | $T_2$ | $T_1, T_2$ | $T_1, T_2$ | $T_1, T_2$ | TRUE | TRUE | TRUE | FALSE | FALSE |
| CA'=001 | $T_1, T_2$ | $T_2$ | $T_1$ | $T_1, T_2$ | $T_1, T_2$ | FOLLOWS FIRST ACM STATUS BIT | FOLLOWS SECOND ACM STATUS BIT | TRUE | FALSE | FALSE |
| CA'=110 | $T_1, T_2$ | $T_2$ | $T_1$ | $T_1, T_2$ | $T_1, T_2$ | | | FALSE | FALSE | FALSE |
| CA'=100 | $T_1, T_2$ | $T_2$ | $T_1, T_2$ | $T_1, T_2$ | $T_1, T_2$ | TRUE | TRUE | FALSE | FALSE | FALSE |
| CA'=111 | $T_1, T_2$ | $T_2$ | $T_1, T_2$ | $T_1, T_2$ | $T_1, T_2$ | TRUE | TRUE | FALSE | TRUE | FALSE |
| CA'=011 | $T_1, T_2$ | $T_2$ | $T_1, T_2$ | $T_1, T_2$ | $T_1, T_2$ | TRUE | TRUE | TRUE | FALSE | TRUE |

BILATERAL TIME DIVISION MULTIPLEX SWITCHING SYSTEM

BACKGROUND OF THE INVENTION

This invention relates to time division multiplex communication systems. It relates more particularly to time division switching sytems employing time slot interchange devices.

The most common current practice in communication systems generally is to establish a solid connection between a calling line and a called line via a path which is associated individually and uninterruptedly with the connection for the duration of the call. Thus a quantity of equipment, dependent upon the number of lines served and the expected frequency of service, is provided in a common pool from which portions may be chosen and assigned to a particular call. Such an arrangement is refereed to as "space division" in which the privacy of each conversation is assured by the division or separation of individual conversations in space.

Space division networks are typically electromechanical in part. In the electromechanical networks of today, connections are accomplished by closing the appropriate metallic contact switches in the network. Analog or other signals then pass through the switch contacts. Metallic contacts are bidirectional so that one space path typically allows transmission in two directions. The connection or mapping accomplished by the network is then one in space, e.g., one input to one output. This mapping is changed when new paths are set up or old ones taken down.

In contrast, communication systems have been developed which operate on a time division basis in which a number of conversations share a single spatial communication highway. Privacy of conversation is assured in such systems by the division or separation of individual conversations in time. Thus each conversation is assigned to the common spatial highway for an extremely short, periodically recurring interval, called a time slot, and the connection between any two lines in communication is completed only during the assigned interval or time slot.

Time division networks are typically digital in nature. A digital network switches encoded digital representations of signals or digital data streams between input and outputs. Voice or other analog signals must be converted to digital representations before they can pass through a digital network. This conversion involves a periodic sampling and encoding operation. The sampling and encoding rate is called the frame rate; the frame time is the reciprocal of the frame rate. In a time division digital network, the encoded signals are time-multiplexed together so that the frame time is the time interval between the successive appearance of encoded values from the same signal or channel on the line. The time slot duration is the time occupied by a sample of one channel and is equal to the frame time divided by the number of channels multiplexed together.

A critical problem is presented in both space and time division systems when one or more stages of switching are interposed between the calling and called lines. This problem is termed "blocking" and arises when a portion of the switched path is not available for assignment to a potential connection.

Space division networks minimize the blocking problem primarily through redundancy of available network paths which, of course, is expensive. Time division networks treat the problem by interchanging the time slots assigned to particular call connections in various stages of the network. This is accomplished by selectively incorporating delay in the common highways or intermediate the switching elements. Thus a conversation transmitted in one time slot on a first highway may be shifted to different time slots in successive highways to which it is switched enroute to its destination. The provision of a capability for rearranging the time slots on which a given conversation is transmitted allows a significant reduction in the blocking probability as compared to a system of equal spatial cross-section without such a capability. Collectively, the techniques for providing such a capability have come to be known as time slot interchanging.

In general, time slot interchanging has been accomplished by selectively introducing delay in the path of signals arriving in given time slots so that upon exiting the switching system they appear in different time slots. Such techniques are described, for example, in U.S. Pats. Nos. 3,172,956 and 3,446,917 issued to H. Inose et al. on Mar. 9, 1965 and Mar. 27, 1969, respectively, and in H. Inose et al., "A Time Slot Interchange System in Time-Division Electronic Exchanges," *IEEE Trans.* Vol. CS-11, p. 336 (September 1963); C. Y. Lee, "Analysis of Switching Networks," *Bell System Technical Journal*, Vol. 34, p. 1287 (November 1955); and U.S. Pat. No. 3,573,381 issued to M. J. Marcus on Apr. 6, 1971.

In time division communication systems of the prior art, common practice has been to perform the switching function in time-shared space division networks. For example, switching may be performed in arrays wherein input lines comprise one set of conductors (horizontal or vertical) and output lines comprise the other set of conductors. In a common configuration, gates are connected as crosspoints in the array and are selectively enabled in each time slot. The result is to establish an array having, in each time slot, a connection between each input line and an output line. The spatial configuration of the array varies from time slot to time slot as different combinations of crosspoints are enabled.

More recently, time division communication systems have been described which utilize switching capabilities provided by arrays with data storage devices connected at the crosspoints. These storage devices allow a call entering the switching array in one time slot to leave the array in another time slot. This approach to implementation of the switching function allows added flexibility in network design. In particular, for a switching array of a given size, the probability of there being no available path through the switching network for potential call (blocking probability) is minimized, since the time slots may be reordered to accommodate inavailability of a common time slot in given input and output conductors. A crosspoint storage switching array of this type is described in detail in U.S. Pat. No. 3,573,381, issued to M. J. Marcus on Apr. 6, 1971.

It is an object of the present invention to provide an improved switching system including arrays of the type having data storage devices connected at the crosspoints. In particular, a network of arrays each having two sets of input highways and two sets of output highways is provided, whereby both connections required for a two-way communication can be established. Advantage is taken of spital and temporal symmetries in the connection paths to achieve this result. Since both connections are established in a single array, a reduction in hardware over the prior art is achieved.

It is another object of the present invention to provide a switching system wherein a common local control is used efficiently to establish both of the two connections required at each stage of switching for two-way communication.

It is still another object of this invention to provide a switching network wherein a single bilateral crosspoint store in each switching stage accommodates both connections for a two-way communication.

It is yet another object of this invention to provide a bilateral crosspoint store suitable for use in the bilateral crosspoint switching arrays herein described. Such a bilateral crosspoint store is designed to achieve hardware economy through changes in function of components therein for providing both of the connections required for each two-way communication.

It is a further object of this invention to provide means for operatively interconnecting bilateral switching arrays into a bilateral switching network and means for operatively interconnecting the bilateral switching networks with subscriber facilitiies, on one side, and with a bank of time slot interchangers, on the other side of the network.

It is another object of this invention to provide local control means associated with each highway pair interconnecting switching arrays for directing the progress of calls through the switching network.

It is a further object of this invention to provide local control means associated with each highway pair connecting a switching array with a time slot interchanger, for directing the progress of calls through the time slot interchanger bank.

It is still another object of this invention to provide means for implementing call setup and release by modifying data stored in said local control means and by providing for pulse stuffing and pulse absorbing operations at the several bilateral crosspoint stores and time slot interchangers.

It is yet another object of this invention to provide means for implementing call setup and release at all stages of the switching network simultaneously.

SUMMARY OF THE INVENTION

These and other objects are achieved in accordance with one embodiment of the present invention in the form of a multistage switching network connected between line units which provide connection to subscriber lines, on one side of the switching network, and a plurality of time slot interchanger devices, on the other side of the network. The elemental switches of this multistage switching network comprise bilateral crosspoint stores connecting two sets of input highways and two sets of output highways. Each store is connected to two input highways and two output highways. Typically, each row in such a switching array may contain one input and one output highway on the side of the array designed to be nearest the line unit highways. Each column in the array may then contain one input and one output highway which is adapted to provide connections to the time slot interchanger side of the system.

A two-way communication between two subscribers is established in such a network by providing a first connection path whereby signals in the time slot assigned to a first subscriber are routed from the line unit corresponding to that subscriber to an input highway on the line unit highway side of the network through switching arrays in successive stages of the network. In accordance with the general nature of switching networks with crosspoint storage, the time slot in which the aforementioned signals occur may differ from one stage to the next. When the signals reach an output highway on the time slot interchanger side of the network, they are routed through a time slot interchanger providing a general time slot interchange capability, and then to an input highway on the time slot interchanger side of the network. The signals are then transmitted through the stages of the switching network in reverse order along a spatial path chosen to direct the signals to the output highway which is connected to the line unit corresponding to the second subscriber.

The second connection necessary for the two-way communication begins at the line unit belonging to the second subscriber. Signals in the time slot assigned to the second subscriber are routed to an input highway on the line unit highway side of the network. This input highway is row-wise paired with the aforementioned output highway connected to the second subscriber's line unit. The signals are routed in the opposite direction along the same spatial path heretofore described for the transmission of signals originating with the first subscriber, thus taking advantage of symmetry in the two required connection paths. The time slot interchanges which take place from stage to stage in this second connection path are complementary to those of the first connection path. Although a separate time slot interchanger may be used in the second connection path to connect the output and input highways on the time slot interchanger side of the network, a bilateral time slot interchanger of the type described in my copending application, Ser. No. 214,144, filed Dec. 30, 1971, now U.S. Pat. No. 3,740,483, may advantageously be used to provide both required connections.

In each switching array in the network, input and output interactions on the line unit highway side input and output highways proceed bit by bit under the control of a local memory which selects, in each time slot, one bilateral store in each row to receive an input bit and to direct an output bit to the line unit highway side input and output highways, respectively, associated with that row. Input and output interactions with the input and output highways on the time slot interchanger side of the array do not proceed bit by bit under the direction of the local control, but rather proceed from one crosspoint store to the next, down each column in the array. In each time division multiplex signal frame, each store in a column completes its receiving and transmitting interaction with the input and output highways associated with that row before the next store in that column begins its input and output interactions.

Each bilateral crosspoint store typically contains two reversible shift registers which receive and transmit bits in each frame. The roles of the two shift registers are reversed in alternate frames, and their connections to the input and output highways altered so that data received from a time slot interchanger side input highway in one frame is transmitted to a line unit highway side output highway in the next frame and so that data received from a line unit highway side input highway in one frame is transmitted to a time slot interchanger side output highway in the next frame. An up-down counter or, alternately, another reversible shift register is provided in connection with each of the aforementioned shift registers to keep certain counts of the number of bits stored in the latter registers. Gating circuitry is provided to interconnect the shift registers appropriately to the input and output highways and to provide appropriate clock pulses for the shift registers and counters.

The present invention can best be understood with reference to the accompanying drawing as briefly described below and to the detailed description which follows.

BRIEF DESCRIPTION OF THE DRAWING

FIG. 17 is a chart summarizing the operation of control circuitry shown in FIGS. 10 and 16;

FIG. 18 is a chart summarizing the operation of the control circuitry shown in FIG. 11;

FIG. 20 is a chart specifying the input/output relations for the control logic in the circuit of FIG. 13.

DETAILED DESCRIPTION

In accordance with the present invention a digital network connects channels on incoming time-division multiplexed lines to channels on time-division multiplexed output lines. This involves a mapping in both the space and time dimensions — *space* in that a call must be switched from an input line to an output line, and *time* in that a call must be switched from a time slot on an input line to a time slot on an output line.

Figure 1:
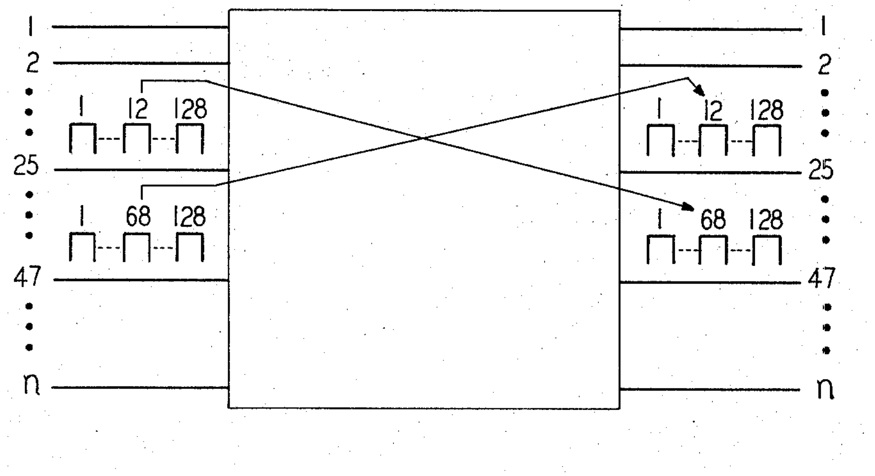
FIG. 1 illustrates symbolically a space time mapping useful in explaining the principles of the present invention.

Digital networks pass encoded signals in only one direction due to the undirectional properties of digital logic. Therefore, two paths must actually be set up to accommodate the two directions of transmission. If it be assumed that input lines and corresponding output lines are paired, i.e., the same numbered input and output lines carry the two directions of the same call, and that time slots are matched, i.e., the same time slot of the paired input and output lines carries one call, then there is an interchange symmetry in the two time-space mappings. An example of this symmetric mapping in time and space is illustrated in FIG. 1, where it is desired to route or switch the digital signal in time slot 12 of input line 25 to time slot 68 of output line 47 and, for the other direction, to switch the signal in time slot 68 of input line 47 to time slot 12 of output line 25. Notice that lines and time slots are interchanged. The mapping illustrated must, of course, be dynamically maintained.

Figure 2A:
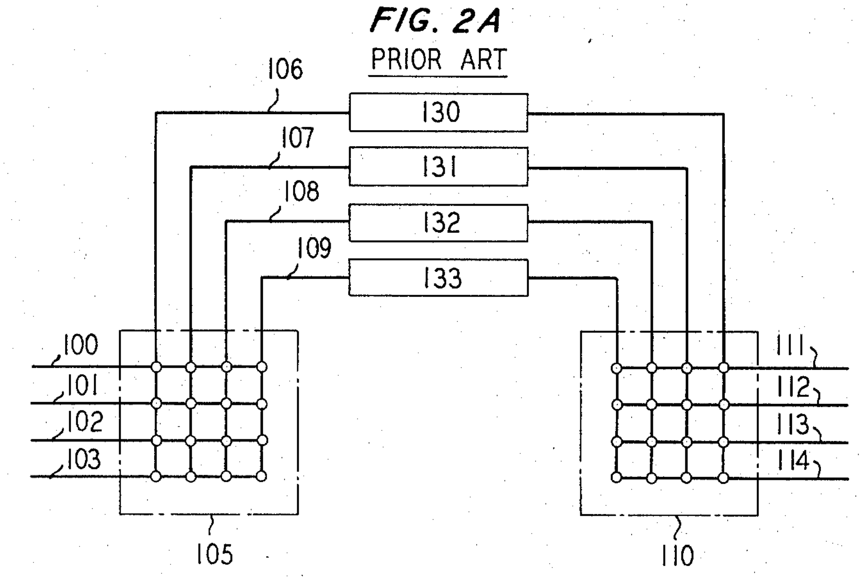
FIG. 2A PRIOR ART
FIGS. 2A and 2B illustrate time division multiplex switching systems of the prior art.
Figure 2B:
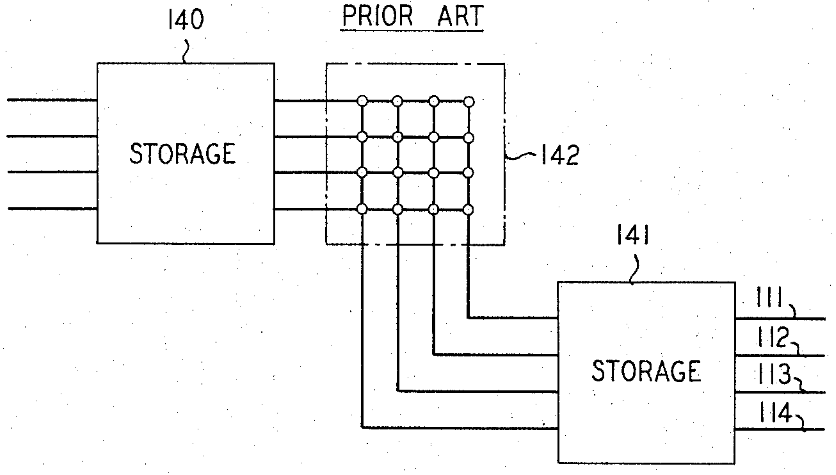
FIG. 2B PRIOR ART

As illustrated in FIGS. 2A and 2B, at least two prior art arrangements are available for switching time division multiplex information through a network of the type shown in FIG. 1. These arrangements are disclosed, for example, in U.S. Pat. No. 3,446,917, issued May 27, 1969 to H. Inose et al.

In FIG. 2A, input highways 100–103 each may contain a plurality of distinct messages in time multiplexed channels which are directed to time channels in output highways 111–114 via switching stages 105 and 110, interstage highways 106–109, and delay devices 130–133. In this arrangement a message may be switched from any input highway to any output highway, so long as any time channel is available in each highway forming the transmission path. Thus an input time channel is switched onto an intermediate highway in its original time channel, and the delay encountered in the corresponding one of devices 130–133 permits it to leave the intermediate highway in a different time channel.

FIG. 2B depicts another prior art approach in which time channel interchange is employed. In this instance the signal transmission rate within the network may be different from that on the highways. Thus message signals are delayed in storage apparatus 140 and 141 until time channels are available through the switch matrix 142 and on the output highways 111–114 respectively.

Figure 3:
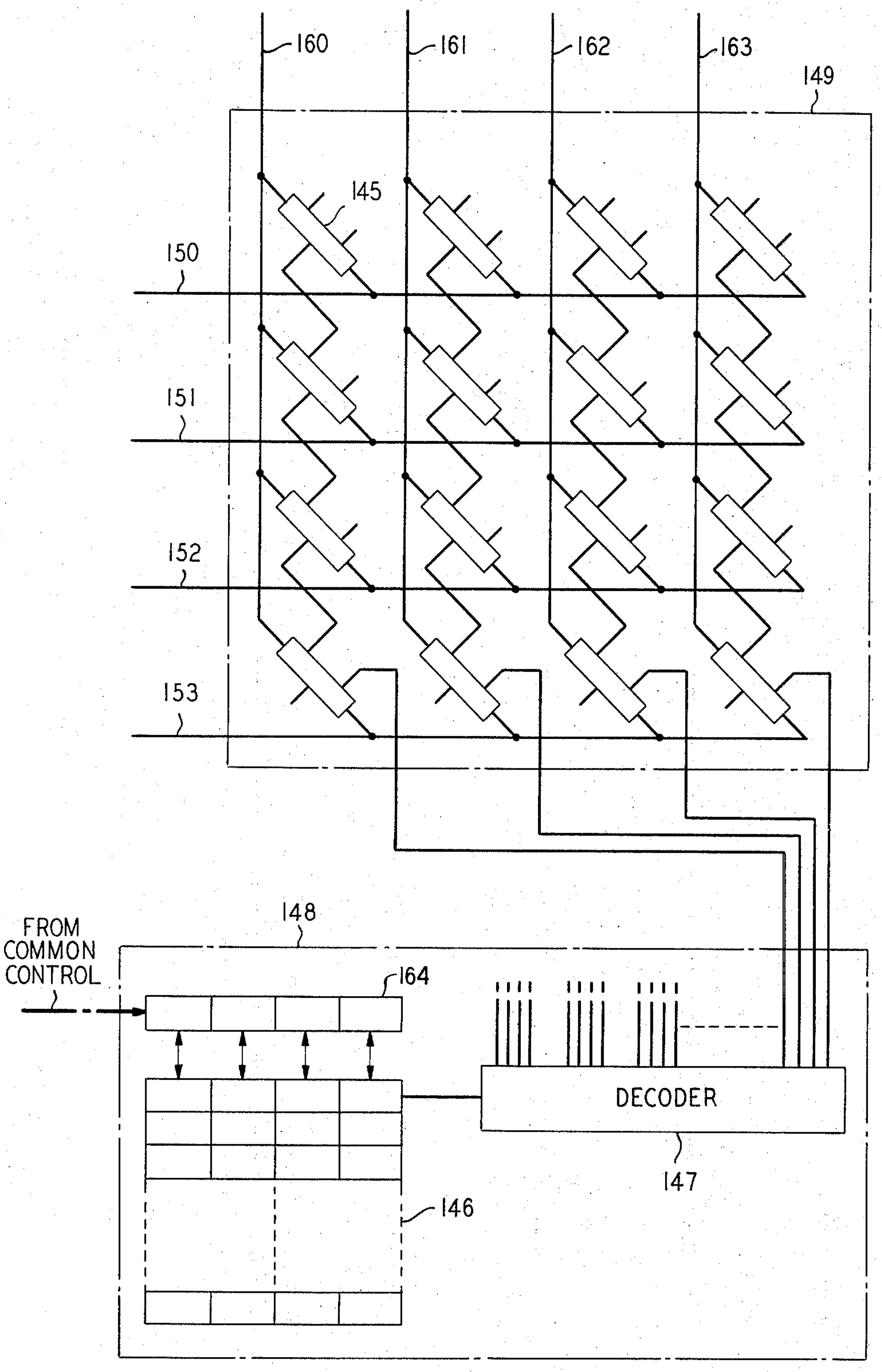
FIG.3 PRIOR ART
FIG. 3 illustrates a time division multiplex switching array of prior art design which uses crosspoint storage elements to provide spatial and temporal switching between the input and output highways.

FIG. 3 illustrates a prior art arrangement which differs considerably from those of FIGS. 2A and 2B. This arrangement is disclosed in U.S. Pat. No. 3,573,381 issued to M. J. Marcus on Apr. 6, 1971. The arrangement of FIG. 3 is distinguished from other prior art switching networks primarily in that both the delay and the switching operations are performed by the same elements. FIG. 3 illustrates a 4 × 4 matrix 149 of such elements 145, known as crosspoint stores, which stores are controlled by local control 148 including memory 146 and decoder 147. The contents of memory 148 are typically changed in accordance with signals received from common control circuits by way of input/output register 164. Input highways 150 through 153 have access to output highways 160 through 163 via the crosspoint stores.

Each crosspoint store 145 typically has two storage registers, which provide it with the capacity to store message signals from input highways 150 through 153 in each frame and also to transmit in each frame on output highways 160 through 163 those message signals which were stored in the previous frame. Thus in each message time slot, one crosspont store in each row is enabled to store the message signal present on its corresponding input highway in that time channel. Simultaneously, the message signals stored during the previous frame are dumped onto the output highways. The signals stored in the stores of the uppermost row of each column are dumped first. When each store has completed dumping its stored signals, it signals the crosspoint store immediately below in its column to initiate the dumping of signals from the latter store. The signals in each store are applied to the corresponding output highway in a reverse sequence from the sequence in which they are received on the corresponding input highway.

It is easily seen that the arrangement of FIG. 3 provides a time slot rearrangement capability, since a message signal stored in one time slot in a crosspoint store in one frame may be transmitted on a different time slot in the subsequent frame. This time slot rearrangement capability makes it possible to accommodate two message signals arriving on different input highways in the same time slot desiring to reach a common output highway. This is accomplished by storing the message signals in the respective crosspoint stores corresponding to the different input highways and the common output highway. The signals are transmitted on the common output highway on different time slots in the subsequent frame.

Figure 4:
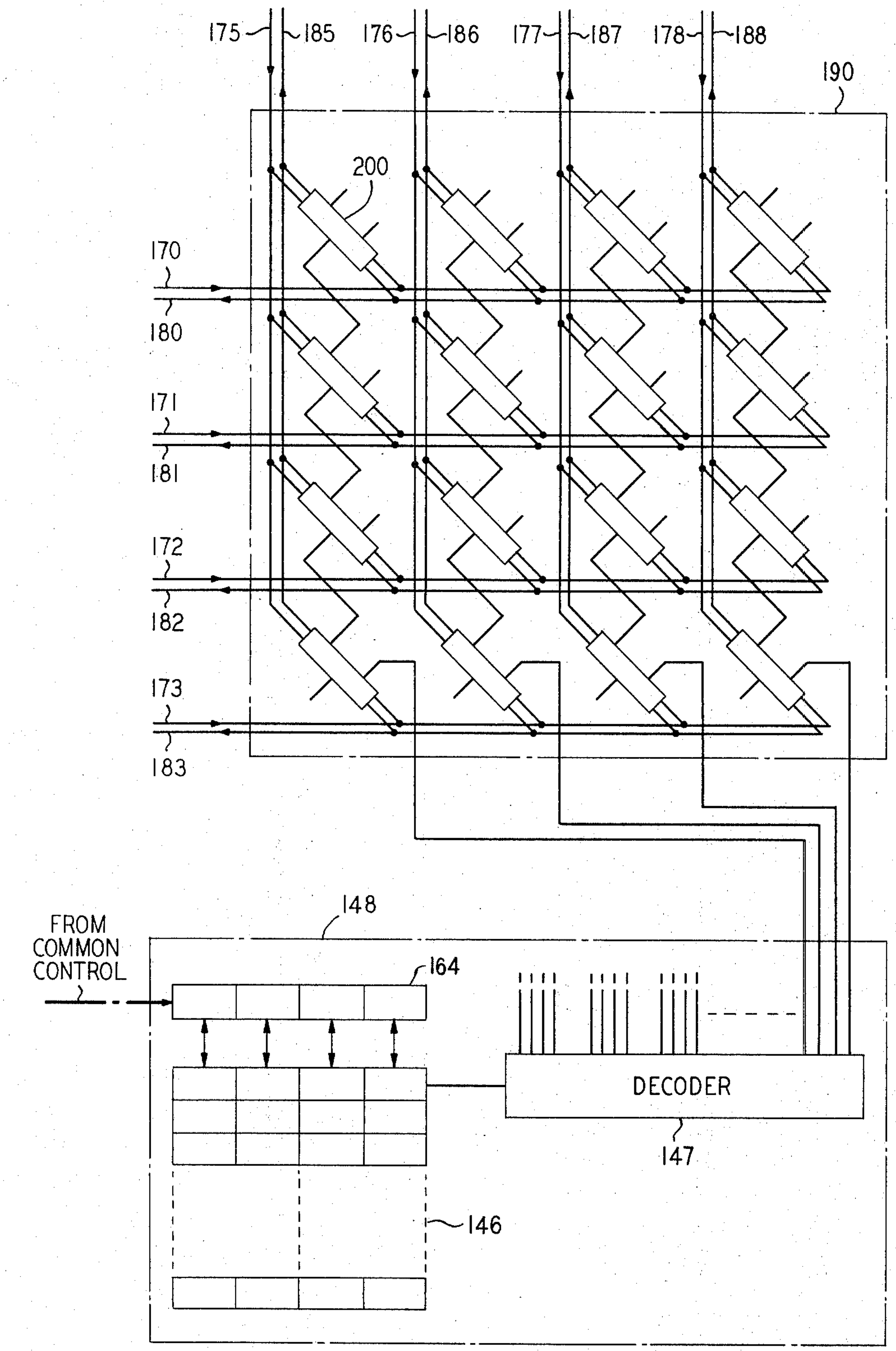
FIG. 4 illustrates a time division switching array in accordance with the teachings of this invention.

FIG. 4 illustrates a bilateral switch suitable for use in the present invention. Such a switch is the subject of my copending application Ser. No. 243,840, filed Apr. 13, 1972, now U.S. Pat. No. 3,773,990, issued Nov. 20, 1973, and assigned to the assignee of the present invention. The disclosure of copending application Ser. No. 243,840 is hereby incorporated by reference in the present disclosure. It is to be noted that the switch matrix 190 of FIG. 4 differs from that of FIG. 3 in that two sets of array conductors are included. Along the left edge of the matrix are found not only input highways 170 through 173 but also output highways 180 through 183. Along the upper edge of the matrix are found not only output highways 185 through 188 but also input highways 175 through 178. Prior art crosspoint stores are replaced with bilateral crosspoint stores 200. These bilateral crosspoint stores differ from the crosspoint stores 145 of the matrix of FIG. 3 in that each is adapted to be connected to two input highways and to two output highways. A local control 148 functions in the same manner as in the matrix of FIG. 3 during static operation.

Input highways 170 through 173 and output highways 185 through 188 correspond, respectively, to input highways 150 through 153 and output highways 160 through 163 of the prior art matrix of FIG. 3. Matrix 190 of FIG. 4 provides exactly the same switching and time slot rearrangement capabilities between message signals received on input highways 170 through 173 and transmitted on output highways 185 through 188 as does the prior art matrix of FIG. 3. The system shown in FIG. 4 is distinguished from the arrangement shown in FIG. 3 by the inclusion of a second set of input and output highways. The provision of this second set of input and output highways, together with the replacement of prior art crosspoint stores with bilateral crosspoint stores 200, results in a matrix which is equipped to provide switching and time slot rearrangement for both connections in a two-way communication according to the symmetry referred to in connection with FIG. 1. The first connection is routed through the matrix via one of input highways 170 through 173 and one of output highways 185 through 188. The second connection is routed through the matrix via one of input highways 175 through 178 and one of output highways 180 through 183. Symmetry in the topology of the most efficient connection paths makes it possible to use common bilateral crosspoint stores 200 and a common local control 148 for both connections.

BASIC SYMMETRY PROPERTIES

It is helpful at this point to consider in more detail the symmetry properties referred to in connection with FIG. 1. These symmetry properties will first be discussed in the context of the complete switching system. It will then be seen why particular symmetric space and time relationships between the bits traveling on the input and output highways associated with each individual bilateral switching matrix are desirably imposed.

Figure 5:
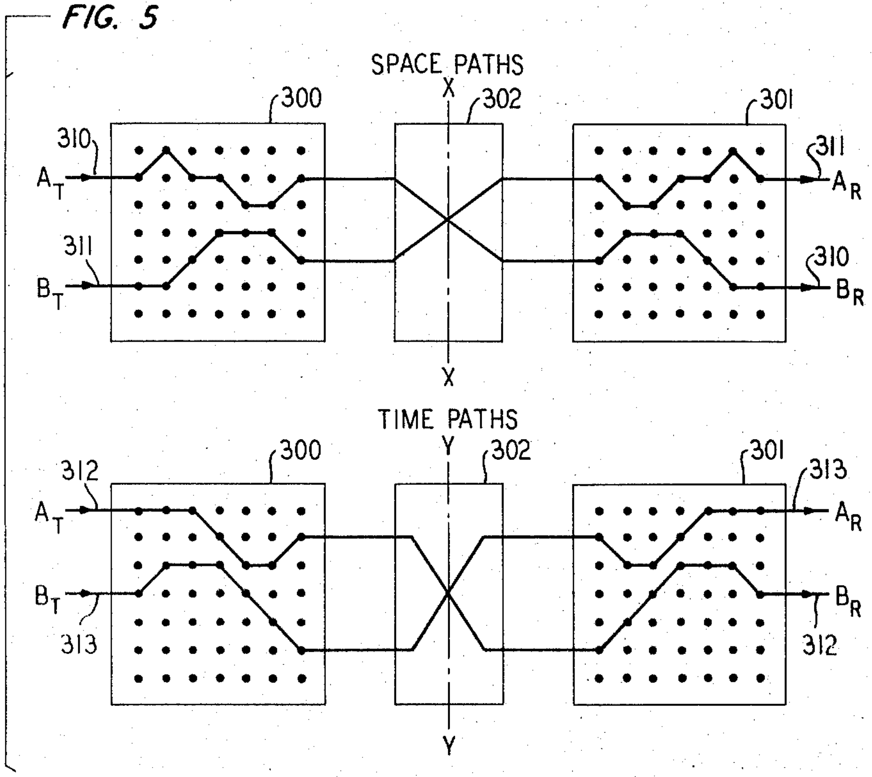
FIG. 5 illustrates certain spatial and temporal symmetries in the connections in a switching network which facilitate an understanding of this invention.

FIG. 5 illustrates schematically the symmetry in the topology of the most efficient connection paths in a complete switching system. Discussion is here restricted only to that class of switching systems wherein time slot interchangers are connected centrally between switching stages. FIG. 5 shows switching networks 300 and 301 connected by time slot interchanger bank 302. Space and time paths through these elements are represented symbolically only, with deviations from the horizontal representing different levels in switching stages, in the case of the space paths, and different time slots, in the case of the time paths.

It is not necessary for an understanding of the basic symmetry properties to depict the switching networks 300 and 301 and the time slot interchanger bank 302 in detail at this point. However, it is clear that each dotted junction in FIG. 5 advantageously represents an individual switching matrix of the non-bilateral crosspoint storage variety. Each column of dotted junctions represents a stage of switching, while each row represents a particular level, in the case of the space paths, or a particular time slot, in the case of the time paths.

In FIG. 5 sources of digital signals from subscribers A and B are represented by transmitting terminals $A_T$ and $B_T$. Terminals for receiving switched digital signals to be directed to subscribers A and B are in turn represented by receiving terminals $A_R$ and $B_R$, respectively. Omitted from this figure for the sake of simplicity is the line unit which typically connects $A_T$ and $A_R$, providing for multiplexing and demultiplexing the digital signals onto a single subscriber loop. Similarly, the line unit for subscriber B is omitted. Also not shown are paths for other digital signals which may be multiplexed onto input and output highways which are the same as or different from those used by subscribers A and B.

It is appropriate at this point to consider one aspect of terminology. The term "time slot interchanger" is used exclusively in this application to designate a device which provides a completely general capability for arbitrary time slot interchanges within frames. Thus, the crosspoint storage switching arrays, both non-bilateral (prior art) and bilateral, which do indeed provide some time slot interchange capability, are not considered time slot interchangers, since the time slot interchanges they are able to provide are not arbitrary, but depend upon the sequence in which output highways are designated for incoming bits. Such general time slot interchangers as the term is used herein are described, e.g., in U.S. Pat. No. 3,700,819 issued Oct. 24, 1972 to M. J. Marcus.

Space path 310 in FIG. 5 is seen to constitute the transmission path from subscriber A to subscriber B. Space path 311 constitutes the transmission path from subscriber B to subscriber A. It is generally true that subscriber A must transmit and receive at the same spatial level, for the sake of simplicity and ease of wiring the system. Hence, subscriber A is represented at the same vertical level on both sides of the system. The same is true for subscriber B. These two paths between subscribers A and B are selected to be symmetric about vertical line X—X. The reason for this selection of symmetric paths is related to desirable efficiency in the central network control which must select paths for each call to avoid blocking. In a typical switching system, the central network control computes a non-blocked transmission path from, say, subscriber A to subscriber B. It is known that a symmetric path from subscriber B to subscriber A exists which is also non-blocked. It is wasteful, then, to have the central network control compute a new transmission path from subscriber B to subscriber A. Rather, the symmetric path, as illustrated in FIG. 5, is chosen.

Time path 312 is the transmission path from subscriber A to subscriber B, and time path 313 is the transmission path from subscriber B to subscriber A. From consideration of these time paths, it is clearly evident that the switching networks 300 and 301 are advantageously of the aforementioned crosspoint storage type having time slot rearrangement capability. Time paths through more conventional networks without such a capability would typically be represented by horizontal lines, since the same time slot would be used throughout the network. It is generally true that subscriber A must transmit and receive in the same time slot. Hence, subscriber A is represented at the same vertical level on both sides of the time path diagram. The same is true for subscriber B. The two time paths 312 and 313 are selected to be symmetric about vertical lines Y—Y, for the same symmetry-related reason discussed above.

The bilateral switching arrangements of the present invention take advantage of the fact that both the space and time paths are symmetric through switching networks 300 and 301. Accordingly, the two networks are combined into a single bilateral switching network. Visualized geometrically in terms of FIG. 5, this combining can be represented by a folding of network 301 about axes X—X and Y—Y so that it becomes congruent with network 300. The two non-bilateral crosspoint storage switching matrices at each pair of congruent dotted junctions are combined into a single bilateral crosspoint storage switching matrix. FIG. 4, discussed above, represents a 4 × 4 bilateral switching matrix suitable for inclusion in such a network. The set of input highways 170 through 173 and the set of output highways 185 through 188 correspond to paths through network 300 in FIG. 5. The other set of input highways 175 through 178 and the set of output highways 180 through 183 correspond to the symmetric paths through network 301. The symmetry properties outlined above make it possible to combine the two networks so that common local controls and common bilateral crosspoint stores may be used in setting up the symmetric paths.

It is also the case that due to symmetry properties the bank of time slot interchangers 302 connected in links between switching stages of networks 300 and 301 can be reduced to a bank of half as many bilateral time slot interchangers. The manner in which a bilateral time slot interchanger replaces two prior art time slot interchangers is described in detail in my copending application, Ser. No. 214,144, filed Dec. 30, 1971, now U.S. Pat. No. 3,740,483, and assigned to the assignee of the present invention.

Figure 6:
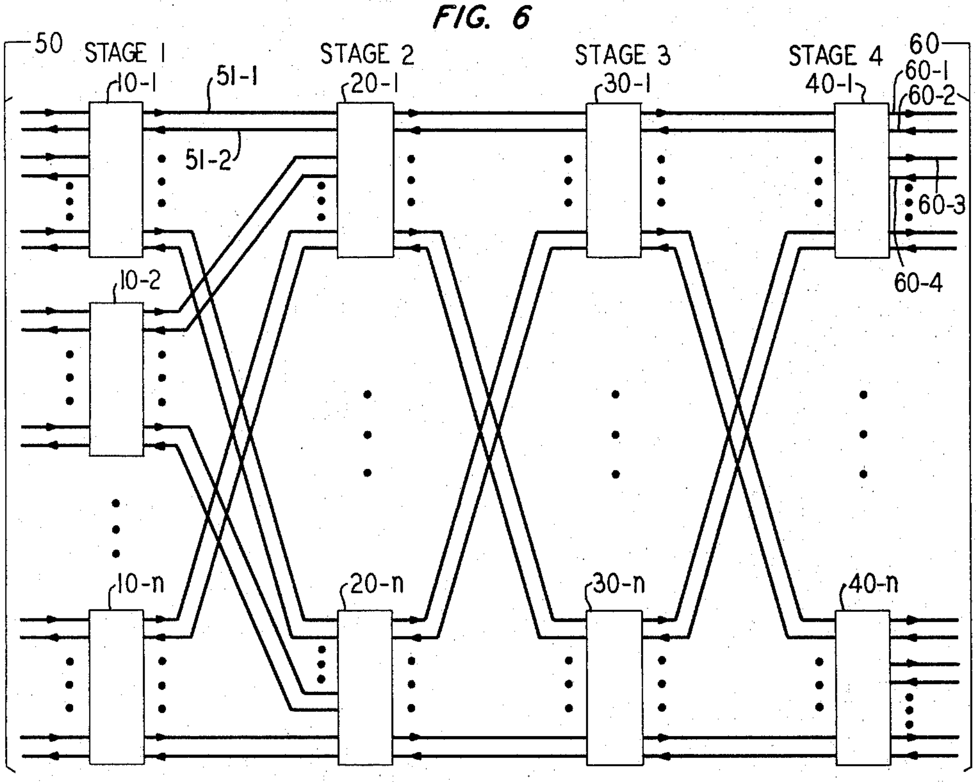
FIG. 6 shows a bilateral switching network constructed according to the teachings of this invention.

FIG. 6 illustrates in greater detail a bilateral crosspoint storage switching network designed to take the place of unilateral switching networks 300 and 301 of FIG. 5. The network of FIG. 6 is seen to have four stages, Each bilateral switch 10-*i*, 20-*i*, 30-*i*, or 40-*i*, ($i = 1,2,\ldots,n$) is of the type described above with reference to FIG. 4. For each bilateral switch 10-*i*, 20-*i*, 30-*i*, or 40-*i*, the left side input and output highways in FIG. 6 correspond to input and output highways 170–173 and 180–183 for the switch 190 of FIG. 4. The right side input and output highways of each switch of FIG. 6 corresponds to input and output highways 175–178 and 185–188 in FIG. 4. The bilateral switches of FIG. 6 are shown to be interconnected according to a common arrangement known in the telephone switching art. Other interconnection possibilities of course exist.

In FIG. 6, each pair of input and output highways in the group 50 is adapted to be connected to a multiplexer-demultiplexer device. Corresponding time slots on each of these pairs 50 will typically be used to carry a particular subscriber's input and output data. Each pair of the input and output highway group 60, on the other hand, will typically be connected to a time slot interchanger. These time slot interchangers provide time slot interchange capability between arbitrarily selected pairs of lines.

Figure 7A:
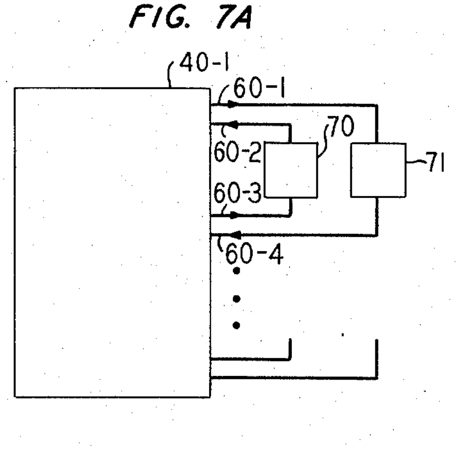
FIGS. 7A and 7B show alternate arrangements for connecting time slot interchange facilities to the bilateral switching network of FIG. 6.
Figure 7B:
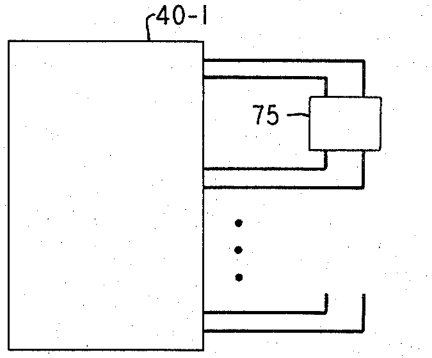

FIGS. 7A and 7B show the manner in which time slot interchangers may be connected to the network of FIG. 6. FIG. 7A shows conventional time slot interchangers 70 and 71 connected to two adjacent input and output highway pairs of switch 40-1. This connection is understood to be repeated for each set of adjacent pairs in input-output highway gro0up 60 of FIG. 6. Alternately, a bilateral time slot interchanger 75, as shown in FIG. 7B may efficiently replace a pair of conventional time slot interchangers. Bilateral time slot interchangers are described in my copending patent application Ser. No. 214,144, filed Dec. 30, 1971, now U.S. Pat. No. 3,740,483, and assigned to the assignee of the present invention, and hereinafter in the present application. The disclosure in said application Ser. No. 214,144 is hereby incorporated by reference in the present disclosure. Although the highways and highway pairs referenced in FIGS. 7A and 7B are shown in adjacent physical locations, no such limitation is fundamental to the present invention. Thus, the time slot interchangers may interconnect arbitrarily placed highways and highway pairs.

THE BILATERAL SWITCHING MATRIX

In order to discuss the operation of the basic bilateral switching matrix, reference will be made to the 2 × 2 switching matrix of FIG. 8. Discussion of this switching matrix, rather than the 4 × 4 switching matrix of FIG. 4, will simplify the exposition while still making clear the principles of the invention.

Figure 8:
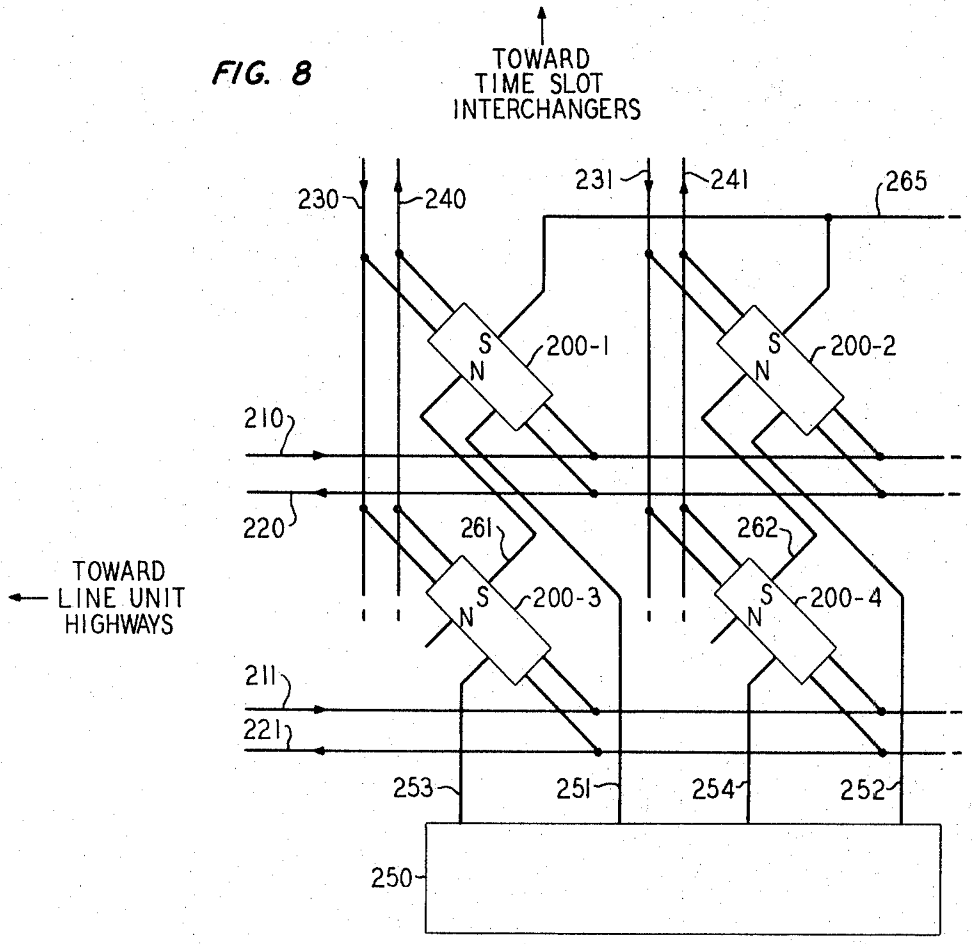
FIG. 8 illustrates another time division switching array constructed according to the teachings of this invention.

In FIG. 8 bilateral crosspoint stores 200-1, 200-2, 200-3, and 200-4 are connected to input highways 210, 211, 230, and 231, and output highways 220, 221, 240, and 241. Local control 250 is connected to the bilateral crosspoint stores by transact control lines 251, 252, 253, and 254. Local control 250 will be discussed in detail below in connection with FIGS. 10–12. For the present it may be noted that local control 250 typically contains control memory means. Local control 250 also typically contains decoding means designed to select a unique combination of TRANSACT control lines 251–254 for each different word read from the control memory means. Control lines 261 and 262 connect bilateral crosspoint stores 200-1 with 200-3 and 200-2 with 200-4, respectively.

It will be convenient to refer to the switch of FIG. 8 as having a line unit highway "side" and a time slot interchanger "side." In this regard the line unit highway side of the 2 × 2 switch is simply that side of the switch closest to the line unit highways. Other switching stages may be interposed between the switch of FIG. 8 and the actual line unit highways. Likewise, the time slot interchanger side of the switch need not be connected directly to time slot interchangers, but may instead be followed by subsequent bilateral switching stages.

Input highways 210 and 211, together with output highways 240 and 241, furnish transmission paths from the line unit highway side of the switch to the time slot interchanger side of the switch. In terms of aforementioned symmetry properties, these highways correspond to paths through network 300 of FIG. 5. Input highways 230 and 231 and output highways 220 and 221 furnish, on the other hand, connections for transmission paths from the time slot interchanger side of the switch to the line unit highway side of the switch. These latter highways correspond to paths through network 301 of FIG. 5.

In each time slot in which message data appears, local control 250 selects and activates one of TRANSACT control lines 251 or 252. The activated control line causes its associated bilateral crosspoint store 200-1 or 200-2 to receive and store the bit present on input highway 210 in that time slot. Each bit appearing on input highway 210 is therefore routed to either bilateral store 200-1 or bilateral store 200-2 depending on which control line is activated. These stored bits are to be transmitted in the next frame to the one of output highways 240 and 241 which corresponds to the selected store. Simultaneously, as the bit from input highway 210 is stored, the activated TRANSACT control line causes its associated bilateral store to transmit a bit previously stored in the preceding frame to output highway 220. As will be seen, these previously stored bits will have been received from either input highway 230 or input highway 231. Each bit transmitted on output highway 220 thus comes from one of stores 200-1 and 200-2, depending on whether TRANSACT control line 251 or TRANSACT control line 252 is activated.

Likewise, in each time slot in which message data appears, local control 250 selects and activates one of TRANSACT control lines 253 and 254. The activated TRANSACT control line causes its associated bilateral crosspoint store 200-3 or 200-4 to receive and store a bit from input highway 211 and to transmit a bit previously stored in the preceding frame to output highway 221. The bits received and stored from input highway 211 are to be transmitted in the next frame to the output highway 240 or 241 corresponding to the selected store. The previously stored bits transmitted on output highway 221 were received from the input highway 230 or 231 which is associated with the selected crosspoint store.

Thus far the transmission and reception of bits from input highways 210 and 211 and output highways 220 and 221 (line unit highway side) have been considered. As has been seen, the input and output operations associated with these highways proceed under the direction of local control 250.

The input and output operations governing the reception and transmission of bits on input highways 230 and 231 and output highways 240 nd 241 (time slot interchanger side) do not proceed under the direction of local control 250. Instead, these operations proceed from one crosspoint store to the next, down each column. At the beginning of each frame, the START terminals S of bilateral stores 200-1 and 200-2 are activated by control line 265. This initiates a sequence of input and output operations for the time slot interchanger side of the network.

When a TRUE signal is applied at START terminal S of a bilateral store, that bilateral store begins to deliver, to its associated output highway on the side of the network nearest the time slot interchangers, in successive time slots, the group of bits which were stored in the previous frame from its associated input highway on the line unit highway side of the network. For each bit so delivered a bit is also stored from the associated input highway on the time slot interchanger side of the network, for transmission in the next frame on the associated output highway on the line unit highway side of the network. When the previously stored bits are exhausted, the bilateral store ceases to transmit and receive on the time slot interchanger side highways, and causes a signal on its NEXT terminal, N, to assume the TRUE state.

With an understanding of the sequence of operations initiated when the START terminal S of a particular bilateral store is activated, the input-output operations on the time slot interchanger side of the entire 2 × 2 switch can now be considered in greater detail.

When control line 265 becomes TRUE at the beginning of a frame, bilateral store 200-1 begins transmitting on output highway 240 the group of bits it received from input highway 210 in the previous frame. It receives and stores from input highway 230 a number of bits equal to those transmitted on output highway 240. These bits are stored for subsequent transmission on output highway 220 in the next frame. When the bits to be transmitted on output highway 240 are exhausted, bilateral store 200-1 ceases to transmit and receive on time slot interchanger side highways 230 and 240, and NEXT terminal N becomes TRUE.

The TRUE signal at NEXT terminal N of bilateral crosspoint store 200-1 is transferred via control line 261 to the START terminal S of bilateral store 200-3. Bilateral store 200-3 then begins transmitting on output highway 240 the group of bits it received from input highway 211 in the previous frame. It receives and stores from input highway 230 a number of bits equal to that transmitted on output highway 240. These bits are stored for subsequent transmission on output highway 221 in the next frame. When the bits to be transmitted on output highway 240 from bilateral store 200-3 are exhausted, bilateral store 200-3 ceases to transmit and receive on time slot interchanger side highways 230 and 240.

The interaction of bilateral crosspoint stores 200-2 and 200-4, in the second column of the 2 × 2 switch, with time slot interchanger side input and output highways 231 and 241 proceeds in a manner exactly analogous to the operation of bilateral stores 200-1 and 200-3, discussed in the preceding two paragraphs.

In summary, the most salient points related to the control and operation of the 2 × 2 switch of FIG. 8 are that the input-output interactions of the bilateral crosspoint stores with the highways on the line unit highway side of the matrix are controlled by local control 250. The input-output interactions of the bilateral crosspoint stores with the highways on the time slot interchanger side of the network proceed from one crosspoint store to the next, down each column in the matrix. Bits received from input highways on either side of the matrix in one frame are transmitted to output highways on the alternate side of the matrix in the subsequent frame.

Figure 9:
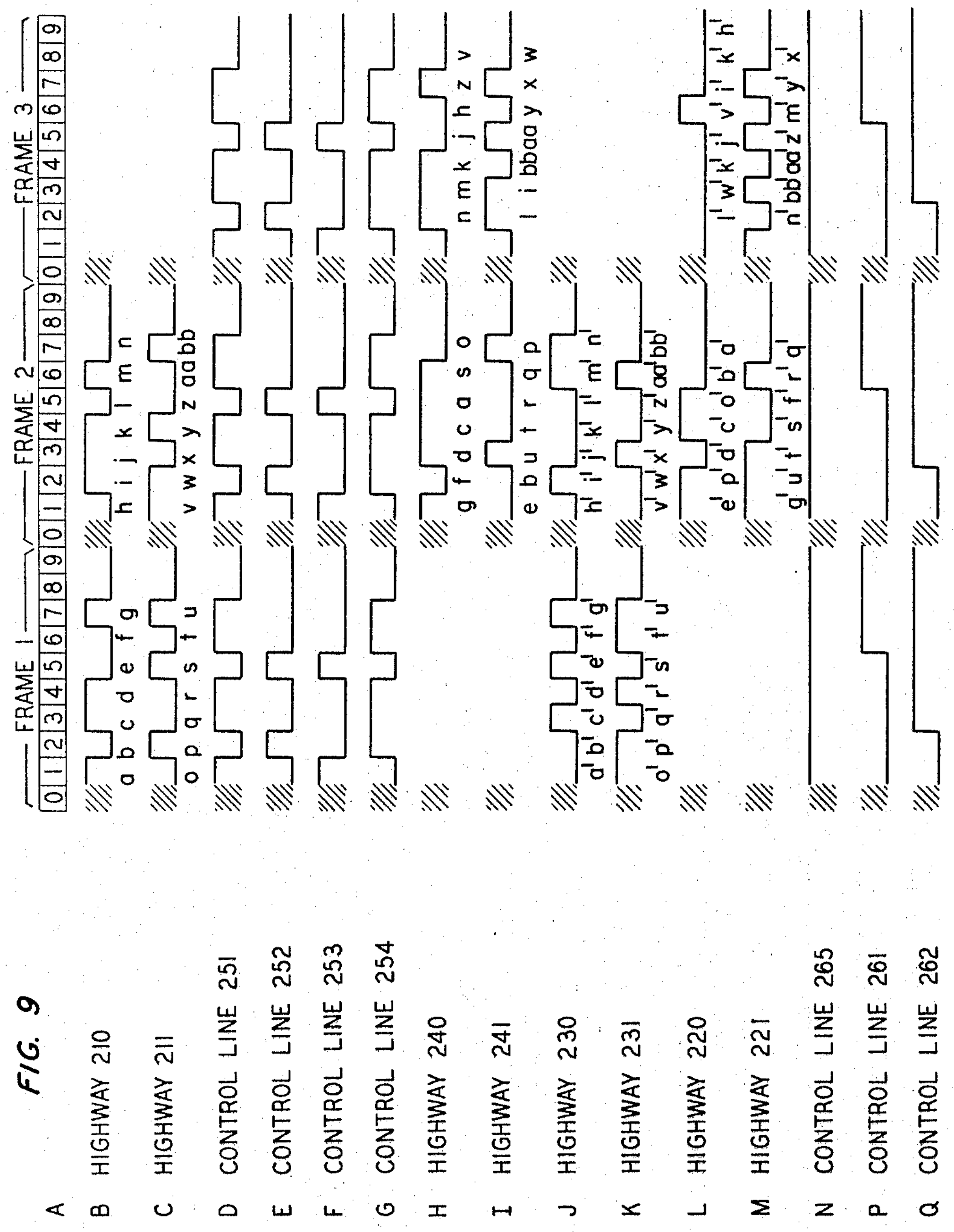
FIG. 9 shows various bit patterns which are examples of those which may occur during the operation of the array of FIG. 5.

It is desirable at this point to elaborate still further with regard to the functional description of the switch of FIG. 8. FIG. 9 presents examples of typical bit patterns which may appear in various time slots on the input and output highways of FIG. 5, together with the signals appearing on control lines 251 through 254, 261, 262, and 265. These bit patterns serve to illustrate the time slot mappings in space and in time which the 2 × 2 bilateral switch of FIG. 8 performs. These mappings are restricted to static operation, i.e., operation when no calls are being added or deleted. The changes which occur in dynamic operation will be described later.

FIG. 9 assumes the well-known principle that data in a time division multiplexed communication system occurs in intervals known as time slots. Each time slot typically corresponds to a particular communication channel. Time slots are grouped together into frames, a frame being the largest sequence of successive time slots which includes no more than one time slot corresponding to a given communication channel.

FIG. 9, line A, shows three time division multiplex signal frames each having 10 time slots. There are nine traffic time slots in each frame. Traffic time slots are those time slots which represent sampled communication data, and are to be distinguished from other time slots in a frame which may be added for purposes of synchronization. Each numbered box within FIG. 9, line A, represents a particular time slot. The single synchronization time slot is numbered "0," while the nine traffic time slots are numbered 1–9.

As indicated in FIG. 9, lines B-M, information is carried in each traffic time slot in the form of a binary "1" or "0." Thus each time slot corresponds to one bit. In general time division communication systems may be designed so that each time slot corresponds to $q$ bits, where $q$ is a positive integer. If $q$ is greater than one, each time slot will contain sampled data comprising more than one bit. For purposes of clarity, the discussion here is restricted to a system where $q = 1$. However, as will be apparent to those skilled in the art, generalizations to systems where $q > 1$ are easily made. The present invention, therefore, is in no way restricted to systems having only one bit per time slot.

Although the frames shown in FIG. 9, line A, have only a single synchronization time slot, it should be noted that a plurality of synchronization time slots may be used to provide necessary or desirable synchronization and error-checking capabilities. A time division signal frame with one synchronization time slot is used for purposes of illustration only, and the instant invention is in no way restricted to systems employing only a single synchronization time slot. It should be pointed out that synchronization data is not necessarily carried on the same communication lines as message data. Rather, synchronization pulses on specially dedicated control lines, occurring in the synchronization time slots, more typically provide synchronization, as will become clear later in this detailed description.

FIG. 9, lines B and C, show typical sequences of binary signals which appear in frames 1 and 2 on input highways 210 and 211, respectively, of FIG. 8. The bits on highway 210 are labeled a-n and those on highway 211 are labeled *o-bb*. The letter designations are useful in identifying bits appearing on the input highways with the corresponding bits appearing later on the output highways. It is noted that only seven of the available nine times lots are in use for message data. The remaining time slots 8 and 9 are available to accommodate added calls.

As noted previously the bits which appear on input highways 210 and 211 in one frame appear in the next frame on output highways 240 and 241. The routing of these individual bits in space and time paths through the 2 × 2 switch is determined by the control signals appearing on TRANSACT control lines 251–254, which are represented in FIG. 9, lines D-G, respectively. These control signals are merely typical, and represent a particular mapping in space and time. A different set of control signals would determine a different mapping. It should be noted that in FIG. 9, lines D-G, the control signals are repetitive in each of the three frames shown. This indicates that the call routing does not change during these three frames. When additional calls are set up and when completed calls are released, it is necessary to alter the control signals in order to provide paths for the added calls or to release unused paths and rearrange the remaining paths left when a call is released. Presently, it is assumed that call routing remains constant from frame to frame.

TRANSACT control line 251 is activated in time slots 1, 3, 4, 6, and 7. This causes bits *a, c, d, f,* and *g,* received on input highway 210 in frame 1, to be stored in bilateral crosspoint store 200-1. TRANSACT control line 252 is activated in time slots 2 and 5. This, in turn, causes bits *b* and *e*, received on input highway 210 in frame 1, to be stored in bilateral crosspoint store 200-2.

TRANSACT control line 253 is activated in time slots 1 and 5. Therefore bits *o* and *s*, received on input highway 211 in frame 1, are stored in bilateral crosspoint store 200-3. TRANSACT control line 254 is activated in time slots 2, 3, 4, 6, and 7. Accordingly, bits *p*, *q*, *r*, *t*, and *u*, received on input highway 211 in frame 1, are stored in bilateral crosspoint store 200-4.

At the conclusion of frame 1, therefore, bits *a*, *c*, *d*, *f*, and *g* have been stored in bilateral store 200-1, bits *b* and *e* have been stored in store 200-2, bits *o* and *s* have been stored in store 200-3, and bits *p*, *q*, *r*, *t* and *u* are stored in store 200-4.

The manner in which these bits are transmitted on output highways in frame 2 is determined by the store-by-store output sequence, proceeding down each column, referred to previously. When, at the beginning of frame 2, control line 265 is activated (FIG. 9, line N), store 200-1 begins transmitting the bits it stored in frame 1 to output highway 240. These bits are stored and transmitted on a last in-first out basis so that bits *q*, *f*, *d*, *c*, and *a* are transmitted on output highway 240 in time lots 1–5 of frame 2. When these bits are exhausted, NEXT terminal N of bilateral store 200-1 activates START terminal S of bilateral store 200-3 via control line 261, as illustrated by FIG. 9, line P. Bilateral store 200-3 then begins transmitting the bits it stored in frame 1 to output highway 240. These bits are of course also transmitted in an order inverse to that in which they were received, so that bits *s* and *o* are transmitted on output highway 240 in time slots 6 and 7 of frame 2. In summary, then, the bits transmitted on output highway 240 in frame 2 are *g*, *f*, *d*, *c*, *a*, *s*, and *o*, in time slots 1–7.

The bits transmitted on output highway 241 in frame 2 can be determined in like manner. The activation of control line 265 at the beginning of frame 2 causes store 200-2 to transmit, in inverse order, the bits it stored in frame 1. Accordingly, bits *e* and *b* are transmitted on output highway 251 in time slots 1 and 2 of frame 2. The exhausting of these bits causes NEXT terminal N of store 200-2 to activate START terminal S of store 200-4 via control line 262, as illustrated in FIG. 9, line Q. Bilateral store 200-4 then begins transmitting, in inverse order, the bits it stored in frame 1. Accordingly, bits *u*, *t*, *r*, *q*, and *p* are transmitted on output highway 241 in time slots 3–7 of frame 2. The bits transmitted on this output highway in time slots 1–7 of frame 2 are, then, bits *e*, *b*, *u*, *t*, *r*, *q*, and p.

The routing of bits from the line unit highway side of the 2 × 2 matrix of FIG. 8 to the time slot interchanger side has now been described. (This routing corresponds to that through network 300 of FIG. 5.) It is noted that a bit appearing on either input highway 210 or 211 may be rounted to either output highway 240 or 241. According to the order in which bits are stored, a bit appearing on one of these input highways may appear in the same or in a different time slot when it is transmitted on an output highay in the next frame.

It may be recalled that the bit routings from the line unit highway side of the switch to the time slot interchanger side of the switch are the same as those described in the aforementioned Marcus U.S. Pat. No. 3,573,381. The control signals appearing on control lines 261–262, 265, and 251–254 of FIG. 8 are analogous to those appearing on corresponding control lines in the Marcus patent.

This invention differs from that disclosed in the Marcus patent in that the same local control and control lines used to control the bit routings from input highways on the line unit highway side of the network to output highways on the time slot interchanger side of the network are used to control symmetric bit routings from input highways on the time slot interchanger side of the network to output highways on the line unit highway side of the network. (The symmetric routing corresponds to the routing through network 301 of FIG. 5.)

In considering in detail the routing of bits from input highways 230 and 231 on the time slot interchanger side of the 2 × 2 switch to output highways 220 and 221 on the line unit highways side of the switch, attention is first directed to FIG. 9, lines J and K, which illustrate typical sequences of bits such as may appear on input highways 230 and 231, respectively. The bits on highway 230 are labeled *a'*-*n'*, and those on highway 231 are labeled *o'*-*bb'*.

As was noted above the bits received on each of input highways 230 and 231 are stored in bilateral stores in their corresponding columns, beginning with the uppermost store in each column and progressing down each column. The number of bits stored in each store is the same as the number of bits transmitted from that store to output highway 240. This number is determined by the number of bits received and stored by that store from input highway 210 in the preceding frame. Since it is assumed that the call routings remain constant, the number of bits stored from input highway 210 in the frame preceding frame 1 is five. In time slot 1 of frame 1 control line 265 is activated, causing the first five bits *a'*, *b'*, *c'*, *d'*, and *e'* from input highway 230 to be stored in bilateral store 200-1 in frame 1. When these bits have been stored, control line 261 is activated, enabling bilateral store 200-3 to store bits *f'* and *g'*.

Likewise, in time slot 1 of frame 1, the activation of control line 265 causes bilateral store 200-2 to begin storing bits from input highway 231. Since bilateral store 200-2 stores two bits in each frame from input highway 210, that bilateral store will store two bits, 0' and *p'*, from input highway 231. When these bits have been stored, NEXT terminal N of bilateral store 200-2 activates START terminal S of bilateral store 200-3 via contol line 262. Since bilateral store 200-4 stored five bits from input line 211 in the frame preceding frame 1, the five bits *q'*, *r'*, *s'*, *t'*, and *r'* will be stored in bilateral store 200-4 in frame 1, In summary, at the conclusion of frame 1, bits *a'*, *b'*, *c'*, *d'*, and *e'* are stored in bilateral store 200-1, bits *o'* and *p'* are stored in store 200-2, bits *f'* and *g'* are stored in store 200-3, and bits *q'*, *r'*, *s'*, *t'*, and *u'* are stored in store 200-4.

The manner in which these stored bits are transmitted to output highways 220 and 221 in frame 2 is determined directly by the control signals present on control lines 251-254 during frame 2. In time slot 1 of frame 2, control lines 251 and 253 are activated, causing bit *e'* to be transmitted from bilateral store 200-1 to output highway 220 and bit *g'* to be transmitted from bilateral store 200-3 to output highway 221. In time slot 2 control lines 252 and 254 are activated, causing bit *p'* to be transmitted from bilateral store 200-2 to output highway 220 and bit *u'* to be transmitted from bilateral store 200-4 to output highway 221. In time slot 3, control lines 251 and 254 are activated, causing bit $d'$ to be transmitted from bilateral store 200-1 to output highway 220 and bit $t'$ to be transmitted from bilateral store 200-4 to output highway 221. The transmittal of bits from output highways 220 and 221 continues in a similar manner during the remaining time slots 4-7 of frame 2. In each time slot one of control lines 251 and 252 and one of control lines 253 and 254 is activated, determining which store in the involved row will transmit a bit to that row's output highway in that time slot. The bits stored in the bilateral stores are, as before, transmitted in the inverse order from that in which they were received. Following this procedure it is easily concluded that on output highway 220 will appear bits $e'$, $p'$, $d'$, $c'$, $o'$, $b'$, and $a'$ and on output highway 221 will appear bits $g'$, $u'$, $t'$, $s'$, $f'$, $r'$, and $q'$ in time slots 1–7 of frame 2.

Now that the routing of bits in space and time from the time slot interchanger side of the switch to the line unit highway side of the switch has been described in detail, it is appropriate to consider the symmetry between this latter routing and the earlier described routing of bits from the line unit highway side of the switch to the time slot interchanger side of the switch. In accordance with this symmetry, if a bit received on one input highway on the line unit highway side of the switch in time slot $\eta$ is routed to a particular output highway on the time slot interchanger side of the switch in time slot $\xi$, then a bit received in time slot $\xi$ on the input highway on the time slot interchanger side of the switch adjacent the aforementioned output highway should be routed to the output highway adjacent the aforementioned input highway on the line unit highway side of the switch in time slot $\eta$.

Verification of this symmetry may be made by reference to the particular example of FIG. 9, lines A–C and H–N. For example, bit $a$ in time slot 1 of frame 1, received on input highway 210, is routed to time slot 5 of frame 2 on output highway 240. In the symmetric routing, bit $e'$ in time slot 5 of frame 1, received on input highway 230, is routed to time slot 1 of frame 2 on output highway 220.

It is useful to make at this point an observation with respect to the control signals on TRANSACT control lines 251–254 shown in FIG. 9, lines D–H. It is noteworthy that one and only one of TRANSACT control lines 251 and 252 and one and only one of TRANSACT control lines 253 and 254 are activated in each time slot in which message data appears. This is consistent with the fact, noted previously, that only one bilateral crosspoint store in each row is enabled to receive the transmit bits on its line unit highway side input and output highways in each time slot. This remains the case if switches of larger dimension than 2 × 2 are considered.

The typical bit samples illustrated in frame 2 of FIG. 9, lines B, C, J, and K, as well as those in frame 3 of FIG. 9, lines H, I, L, and M, have not been considered explicitly. It is clear, however, that these bits represent the frame of input bits and the resulting frame of output bits immediately succeeding the frames discussed in detail above. Since it is assumed that the routing of bits does not change during the succession of frames depicted in FIG. 6, lines A–Q, the frames not discussed in detail do not reveal further information about the operation of the 2 × 2 switch. It may easily be verified that the input bits in frame 2 of FIG. 6, lines B, C, J, and K do in fact result in the output bits in frame 3 of FIG. 6, lines H, I, L, and M under the conditions imposed by the control signals shown in FIG. 6, lines D–G.

Complete Switching System and System Control

At this point some amount of recapitulation is in order. FIG. 6 showed a bilateral switching network with four stages. Each of these stages is shown to comprise $n$ switching matrices, which are of the bilateral crosspoint storage type. Each of these switching matrices takes the basic form shown in FIG. 8, although the 2 33 2 configuration may be suitably expanded as needed. Time slot interchangers are connected in links joining the input and output highways 60 on the right side of the network of FIG. 6 in the manner shown in FIGS. 7A and 7B. The input and output highways 50 on the left side of the network of FIG. 6 are the subscriber time division multiplexed input and output highways of the overall network.

The bilateral crosspoint stores 200 have been described thus far only in functional terms. A detailed circuit arrangement suitable for use in such a store is shown in my aforementioned copending application Ser. No. 243,640. A suitable local control 250 is also described in this copending application. A serially accessed control memory may, for example, be associated with each bilateral crosspoint switch in the manner shown in FIG. 8 of the present application. Memory contents determine the routing of calls through the network. The memory contents are modified when it is desired to set up a new call or to delete a completed one. Modification of local memory contents is done in accordance with call routing information calculated in a central processor which directs all local controls in the system.

It will be found, however, that if the particular bilateral crosspoint stores described in detail in my copending application Ser. No. 243,640, now U.S. Pat. No. 3,773,980, issued Nov. 20, 1973, and the local control techniques described therein are used in a complete switching system, call set up and release operations will result in some scrambling of bits between channels for a few time slots whenever a call is set up or released. While this is acceptable for some applications, due to the relatively low number of call setup and release operations, it has been found that modifications of the bilateral crosspoint stores of copending application Ser. No. 243,640, together with a more sophisticated local control system, will result in a switching network in which there is no dropping, repeating, or scrambling of bits between channels when calls are set up or released. The combination of this more sophisticated local control apparatus with modified bilateral stores and time slot interchangers form the basis for a complete switching system which will form the basis for the remaining discussion.

The complete switching system will be described with reference to FIGS. 10–21.

Figure 10:
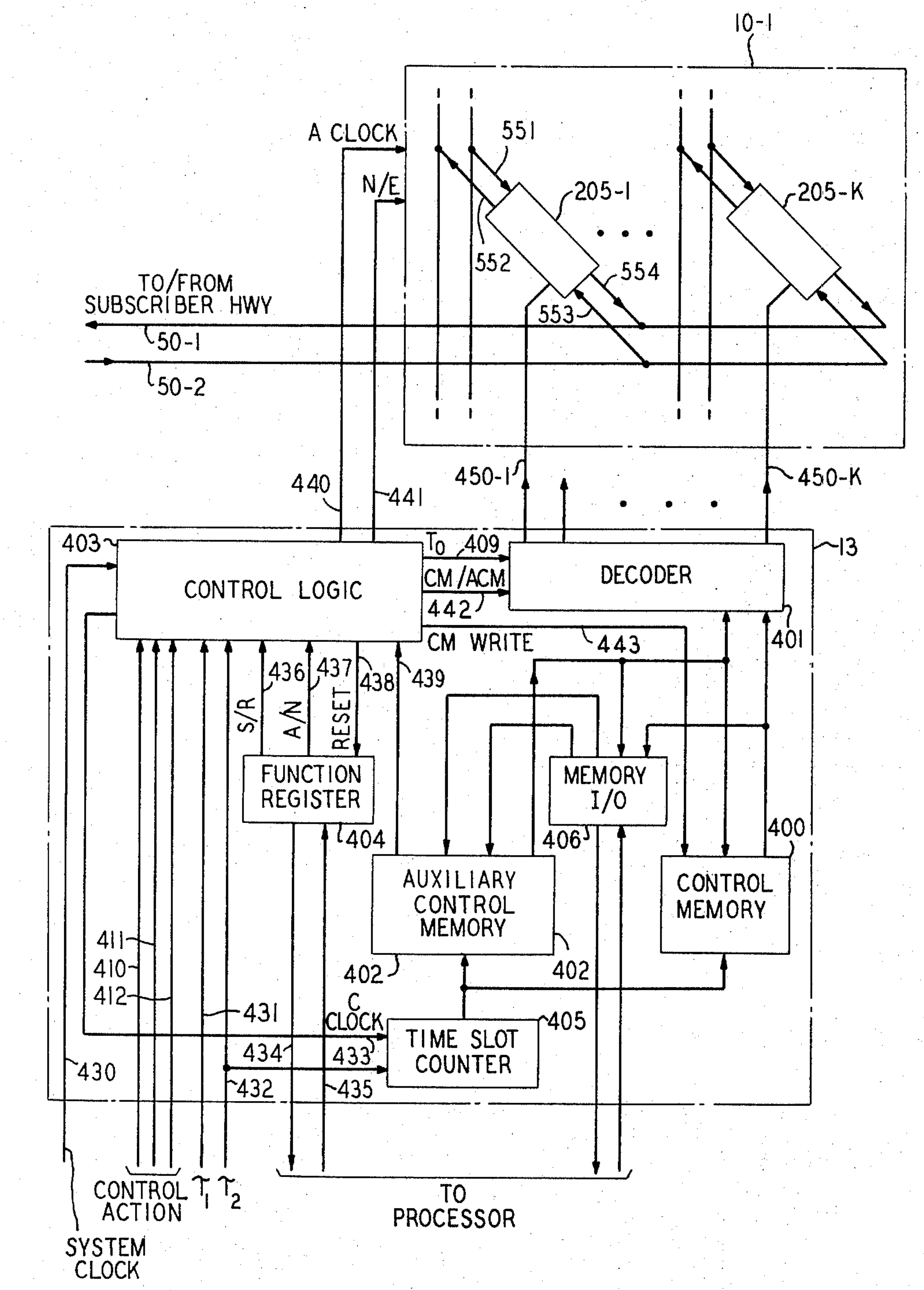
FIGS. 10 and 11 show circuitry for controlling arrays of bilateral crosspoint stores in accordance with one embodiment of the present invention.
Figure 11:
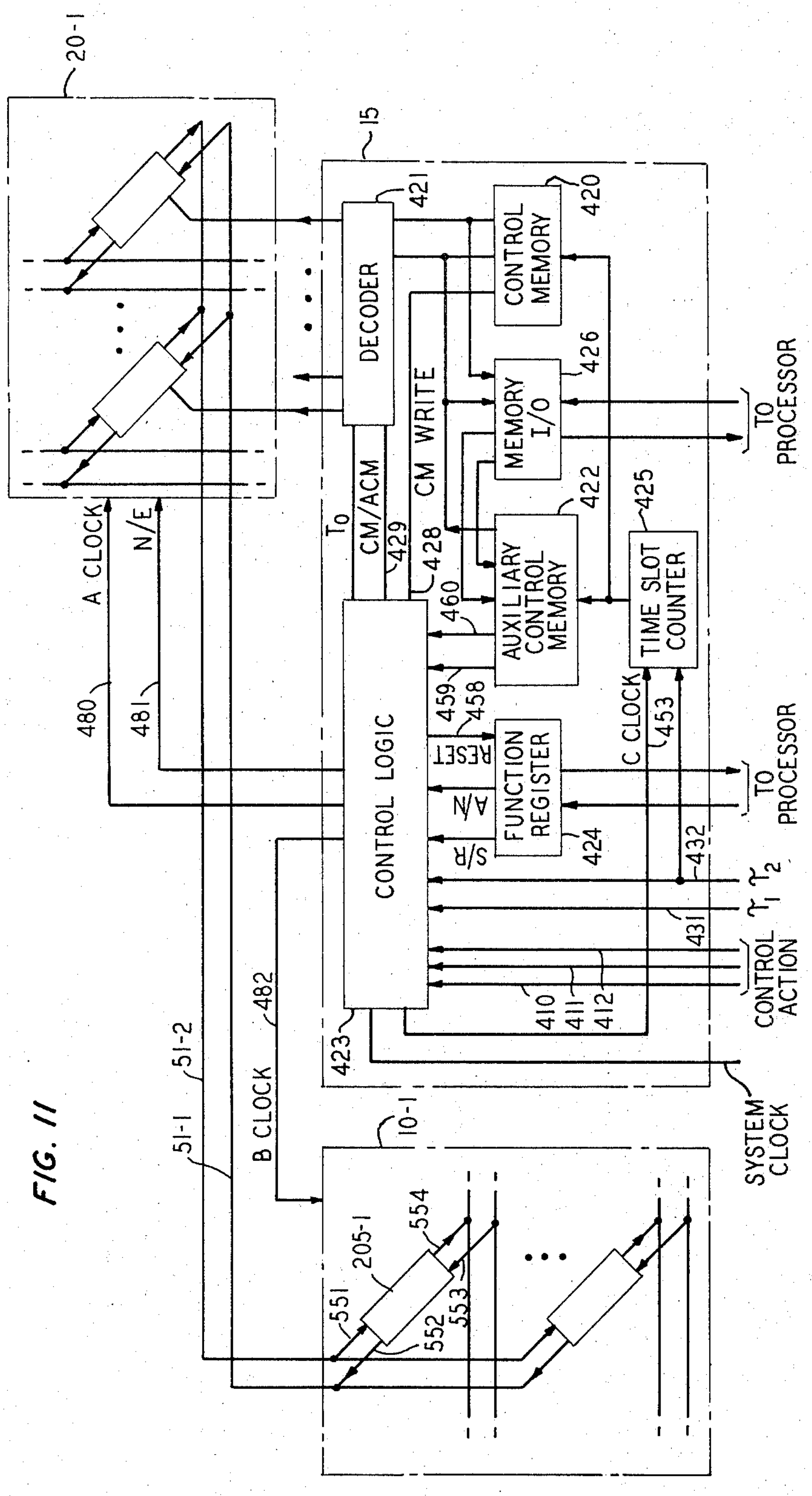

The details of the more sophisticated system control for the bilateral crosspoint stores will be considered in connection with FIGS. 10 and 11. The improved bilateral crosspoint store which is adapted for use in conjunction with this system control is illustrated in typical embodiment in FIG. 12.

Figure 13:
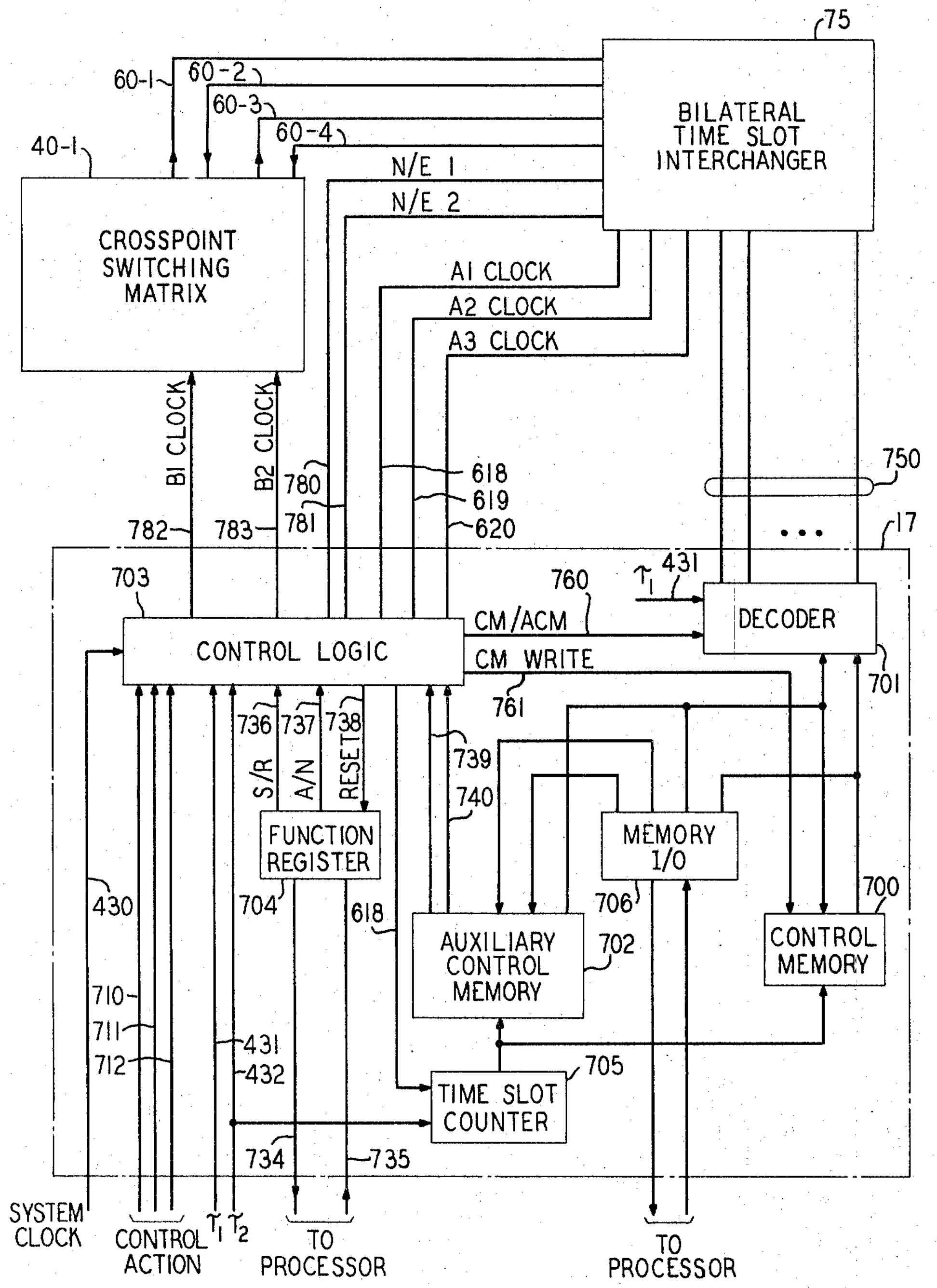
FIGS. 13 and 14 illustrate an improved bilateral time slot interchanger and associated local control circuitry in accordance with one embodiment of the present invention.
Figure 14:
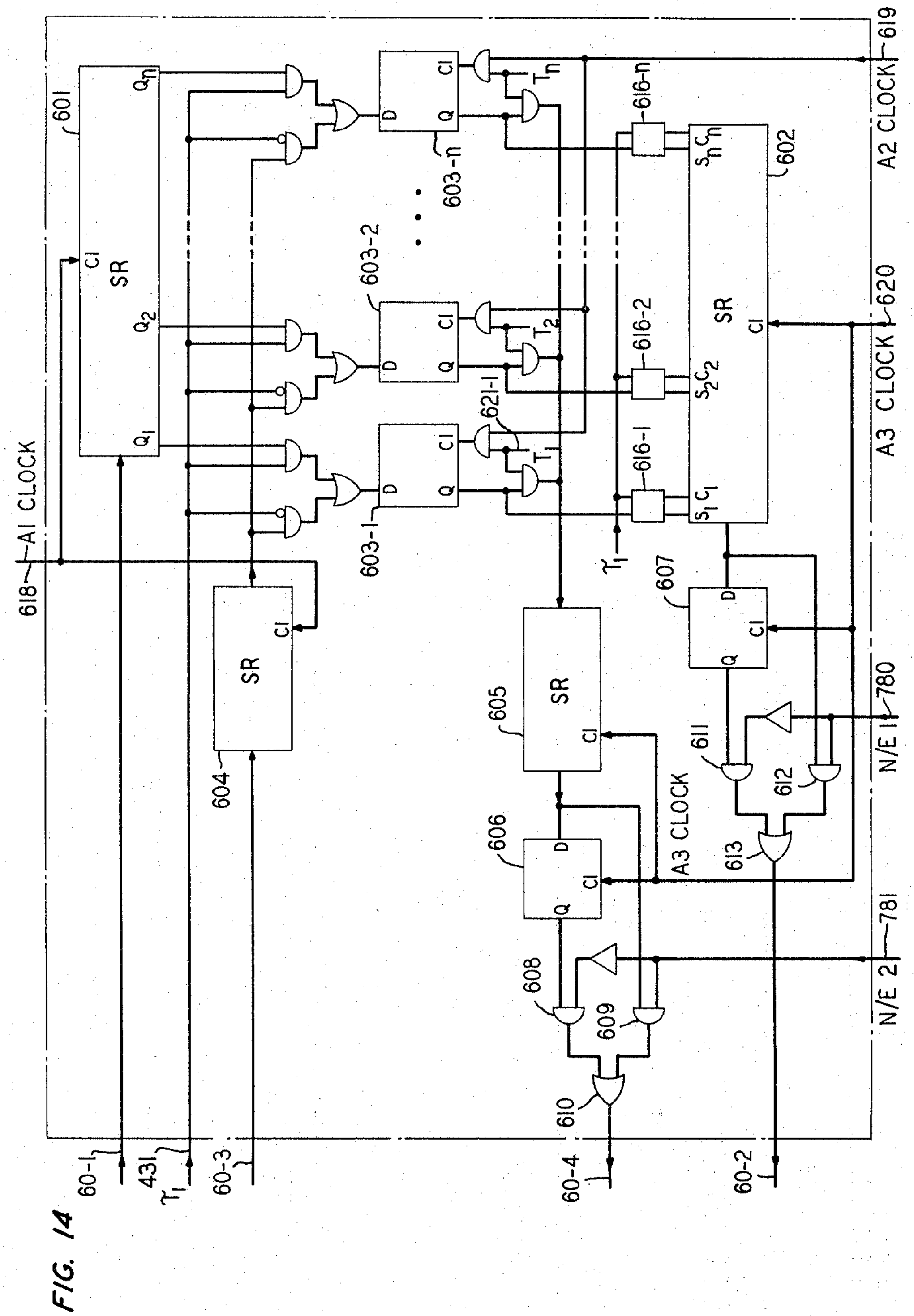

It was noted previously that bilateral time slot interchangers suitable for connection to the bilateral switching network in the manner shown in FIG. 7B are described in my copending application Ser. No. 214,144. It has similarly been found desirable to modify these bilateral time slot interchangers and associated control circuitry to avoid problems during call set up and release similar to those previously described with reference to the bilateral crosspoint stores. FIGS. 13 and 14 illustrate an improved bilateral time slot interchanger and an associated local control entity which eliminate these problems.

In FIG. 8, local control 250 was seen to be associated with one bilateral swithing matrix. In the more sophisticated system control to be discussed with reference to FIGS. 10 and 11, local control functions will be further divided so that one local control entity is associated with each row of a bilateral switching matrix. There are two basic types of local control entities which will be used for controlling bilateral switches. The first type, shown as control entity 13 in FIG. 10, is designed to control a row on a bilateral switching matrix which corresponds to a subscriber input-output highway pair. Thus, each row in bilateral switching matrices 10-1 through **10-*n* of FIG. 6 has a control entity of the type shown in FIG. 10. The second type, shown as control entity 15 of FIG. 11, is designed to control a row on a bilateral switching matrix which corresponds to an intermediate input-output highway pair. Thus each row in bilateral switching matrices 20-1 through 20-*n*, 30-1 through 30-*n* and 40-1 through 40-*n* of FIG. 6 is controlled by a control entity of the type shown in FIG. 11**.

FIG. 10 shows bilateral crosspoint stores 205-1 and **205-*k* which are illustrative of the stores in a single row of bilateral switching matrix 10-1 connected to subscriber highways 50-1 and 50-2. Switching matrix 10-1 could also correspond to any one of the switching matrices 10-1 through 10-*n* in stage 1 of FIG. 6. Local control entity 13** is the local control entity which directs the operation of the bilateral crosspoint stores in the specified row. As noted previously, one such local control entity is associated with each row in each first stage switching matrix connected to a subscriber input-output highway pair.

Control memory 400 contains one word corresponding to each time slot. Decoding of these words in decoder 401 causes enablement of one of TRANSACT control lines 450-1 through **450-*k* in each time slot. The bilateral store corresponding to the enabled control line is thereby signalled to receive a bit from subscriber input highway 50-1 and to transmit a bit, previously stored, to subscriber output highway 50-2. These operations were described previously with reference to FIG. 8**.

Auxiliary control memory 402 is also available for supplying decoder 401 with words to be decoded. Control logic module 403 signals decoder 401 via CM/ACM control line 410 whether to accept data from control memory 400 or auxiliary control memory 402. (Auxiliary control memory 402 also contains, in addition, an extra status bit for each word. This status bit designates whether normal or extended operation of the bilateral crosspoint store designated by the remainder of the decoded word is required. This will be discussed more fully later in connection with control logic module 403 and also in connection with FIG. 12, which details normal and extended operation.) The contents of both control memory 400 and auxiliary control memory 402 can be changed by the central processor via memory input/output module 406. Time slot counter 405 directs memories 400 and 402 to address the particular words corresponding to each time slot.

Figure 15:
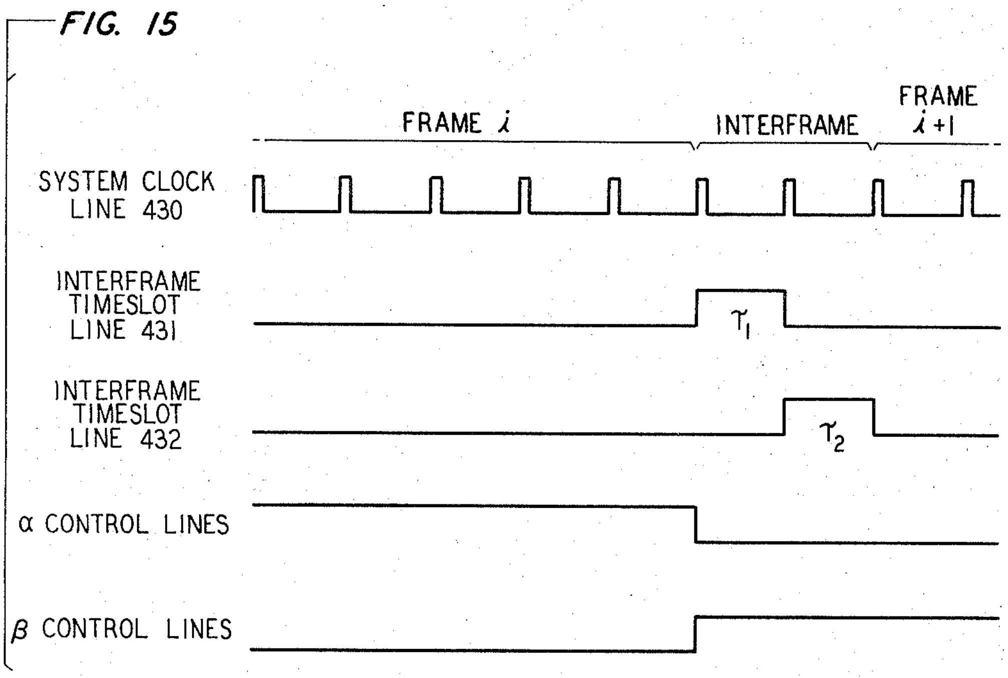
FIG. 15 is a timing chart illustrating the relative timing of pulses appearing on signal paths in the circuits of FIGS. 10–14.

In connection with the discussion of time slot counter 405, it is helpful to interject a few remarks concerning the overall timing of the switching system. System clock line 430 and interframe time slot lines 431 and 432 are common to the entire switching system. FIG. 15 is a timing chart illustrating the nature of the pulses on these lines. The system clock line 430 has a pulse present in every time slot of every frame. The interframe time slot lines 431 and 432 are activated only during the two interframe time slots $\tau_1$ and $\tau_2$. It is noted that two interframe time slots are used in the complete switching system presently being discussed, instead of the single synchronization time slot used in the discussion of FIG. 9. It should be recalled, however, that in the discussion of these latter figures it was noted that more than one synchronization time slot could be used. As a matter of terminology, it is noted that in FIG. 9, the synchronization time slot was considered to be the first time slot of each frame, while in FIG. 15, the two interframe time slots $\tau_1$ and $\tau_2$ are considered to occur between frames. This is purely a matter of convenient definition and design, and not one of great substance.

Returning to time slot counter 405 of FIG. 10, it is seen that it received inputs from C-clock line 433 and from interframe time slot line 432. C-clock line 432 originates in control logic module 403, which will be discussed in greater detail below. It is sufficient to note at this point that the signals on C-clock line 433 are clock pulses derived from system clock line 430. On C-clock line 433 the clock pulses are suppressed during interframe time slots $\tau_1$ and $\tau_2$ and on selected other time slots during the setup and release of calls. Thus C clock line 433 directs time slot counter 405 to advance one position for each time slot not an interframe time slot or a selected time slot as mentioned above. Each time that time slot counter 405 is advanced, it causes the next location in both control memory 400 and auxiliary control memory 402 to be addressed. Interframe time slot line 432 causes time slot counter 405 to reset itself at the occurrence of each interframe time slot $\tau_2$. Thus after the beginning of the next frame the first location in each memory will again be addressed upon the occurence of the first clock pulse on C clock line 433.

The functional requirements for time slot counter 405 have now been specified. Designs fulfilling these requirements with standard counting circuitry and combinational logic are straightforward, and specific details of possible realizations will not be discussed further.

Attention will now be focused on function register 404. The purpose of this element is to provide a communication interface between the central processor and control logic module 403. Communication between function register 404 and the central processor is over control lines 434 and 435. Function register 404 and control logic module 403 are connected by SETUP/RELEASE control line 436, ACTIVE/NORMAL control line 437 and RESET control line 438. Function register 404 provides signals on SETUP/RELEASE control line 436 which indicate whether control logic module 403 is to provide for call setup or call release. ACTIVE/NORMAL control line 437 carries signals which cause control logic module 403 to assume either its normal mode or its active mode. The signals on control lines 436, 437, and 438 typically take the form of binary voltages, the "high" and "low" levels, respectively, indicating the alternative states. Control line 435 allows the central processor to dictate what signals are present on control lines 436 and 437.

Control logic module 403 signals function register 404 via RESET control line 438 when it is desired that function register 404 be reset from its active to its normal status. Thus when RESET control line 438 is made to assume its high level by control logic module 403, function register 404 will cause ACTIVE/NORMAL control line 437 to assume its normal (low) level. Simultaneously, the central processor will be informed of the reset of function register 404 via control line 434.

The functional requirements for function register 404 have now been specified. Since the circuitry required for particular realization may depend on the format chosen for communication with the central processor over control lines 434 and 435, no particular design will be discussed in detail. It is sufficient to note that once the communication format is specified, it is straightforward to achieve a specific realization using elementary techniques of logic design.

Control logic module 403 has as its purpose coordinating the activities of the remaining components in local control entity 13. It provides one set of signals to coordinate the operation of local control entity 13 during normal, or static, operation, and provides altered signals to perform corresponding functions when in its active status, during which call setup and release operations take place.

As mentioned previously, a local control entity of the type shown as entity 13 in FIG. 10 is associated with each row in each switching matrix connected to subscriber input-output highway pairs. All of these local control memories are driven in common by three CONTROL ACTION lines 410, 411, and 412. These leads typically carry binary signals, sent from the central processor, which designate the particular control functions to be performed. All control logic modules are not responsive to the signals on the common CONTROL ACTION lines 410, 411, and 412, however. As will be seen below, only those control logic modules which are in their active status as determined by the signal on ACTIVE/NORMAL control line 437 will be responsive to the signals on the common CONTROL ACTION lines 410, 411, and 412.

Returning to consideration of a specific control logic module, namely module 403 of FIG. 10, it is noted that there are several other inputs in addition to CONTROL ACTION lines 410, 411, and 412. As was previously mentioned, interframe time slot lines 431 and 432 assume their TRUE states in interframe time slots $\tau_1$ and $\tau_2$, respectively. SETUP/RELEASE control line 436 from function register 404 assumes its TRUE (high level) state when the call setup function is desired and becomes FALSE when the call release function is desired. ACTIVE/NORMAL control line 437, discussed in the previous paragraph, assumes its TRUE state when the active status is demanded by function register 404, thus rendering control logic module 403 sensitive to signals on CONTROL ACTION leads 410, 411, and 412. When ACTIVE/NORMAL control line 437 assumes its FALSE state, control logic module 403 assumes its normal status, one of insensitivity to changes on the control action leads. Auxiliary control memory status bit control line 439 carries to control logic module 403 information designating whether the status bit in the currently accessed word in the auxiliary control memory designates normal or extended operation for the bilateral crosspoint stores. (The nature of normal and extended operation will be considered more fully in the discussion of FIG. 12.) The final input to control logic module 403 is system clock line 430.

In addition to the input lines heretofore discussed, control logic module 403 also has a number of output lines. As previously noted, C-clock line 433 provides clock pulses to time slot counter 405 in all time slots except the interframe time slots $\tau_1$ and $\tau_2$. A-clock line 440 provides clock pulses to the bilateral crosspoint stores 205-1 through 205-*k*. The clock pulses on A-clock line 440 are interrupted always in interframe time slot $\tau_1$ and, under certain conditions, in interframe time slot $\tau_2$. NORMAL/EXTEND control line 441 furnishes to the row of bilateral crosspoint stores 205-1 through 205-*k* information determining whether these stores are to operate in their normal mode or in their extended mode. Since only one bilateral crosspoint store in each row is selected in any given time slot, NORMAL/EXTEND control line 441 may be bussed to all crosspoint stores in a row. (To avoid confusion, in FIG. 10, the individual connections of control lines 440 and 441 to each bilateral crosspoint store in the controlled row are not shown.) $T_0$ control line 409 furnishes to decoder 401 information determining when decoder 401 should perform a special operation, namely, making all TRANSACT control lines 450-1 through 450-*k* TRUE in the same time slot. As will be seen below, this special operation must be performed in certain of the interframe time slots during call setup and release operations. $T_0$ control line 409 calls for this special operation by assuming its TRUE state. In normal operation this latter control line assumes its FALSE state. Control memory/auxiliary control memory control line 442 provides signals to decoder 401 determining whether words from control memory 400 or auxiliary control memory 402 will be decoded. Control line 442 will assume its TRUE or FALSE states when words from control memory 400 or auxiliary control memory 402, respectively, are to be decoded. Control memory WRITE control line 443 assumes its TRUE state when it is desired to call for the writing of the contents of auxiliary control memory 402 into control memory 400. During this operation only the principal part of the word, designating the selected bilateral crosspoint store, is written into control memory 400. The extra status bit is excluded. As will be seen below, this writing operation must be carried out during one frame at the conclusion of each call setup or release operation. In normal (static) operation control memory WRITE control line 443 is in its FALSE state. Reset control line 438 assumes its TRUE state in order to signal function register 404 to reset ACTIVE/NORMAL control line 437 to normal status and simultaneously to signal the processor of this reset-to-normal, via control line 434.

Figure 16:
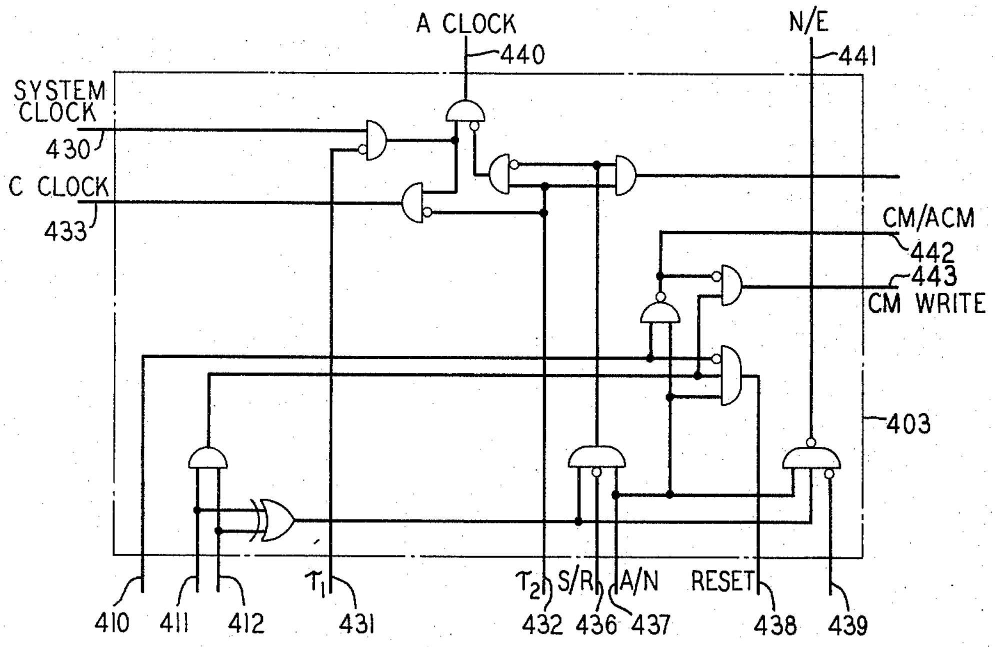
FIG. 16 shows typical circuitry to implement the control logic for the circuit of FIG. 10.

The preceding two paragraphs contain a general description of the functional place of input and output lines terminating in control logic module 403 in the operation of local control entity 13. FIG. 16 shows typical circuitry for control logic module 403. This circuitry is meant to be merely illustrative, since many other realizations using combinational logic or read-only memory are possible. All that is necessary is that the circuitry chosen defines correctly the relations among the binary signals on the various lines terminating in control logic module 403. These relations could be stated in terms of boolean equations. In the succeeding paragraphs, however, they will be stated not in equational form, but in word equivalents which will be seen to lend greater understanding to the operation of the entire local control entity 403. The manner in which the detailed circuitry of FIG. 16 performs to fulfil the logical relations to be specified will not be stated explicitly. That the specific circuitry of FIG. 16 does in fact implement the stated relations may be verified by application of fundamental principles of logic circuitry.

First, the operation of control logic module 403 in its "normal" status will be considered. Operation is "normal" whenever ACTIVE/NORMAL control line 437 is in its FALSE state. When this is the case, operation will be independent of the signals on CONTROL ACTION lines 410, 411, and 412. A- and C-clock signals on control lines 440 and 433, respectively, will be derived from the system clock signal on control line 430, with the exception that interruptions of the system clock signal in interframe time slots $\tau_1$ and $\tau_2$ occur on both A-clock control line 440 and C-clock control line 433. NORMAL/EXTEND control line 441 is in its TRUE state, dictating normal, as opposed to extended operation of the bilateral crosspoint stores in the controlled row. $T_0$ control line 409 remains FALSE. Control memory/auxiliary control memory control line 442 assumes its TRUE state in "normal" status, thereby dictating that decoder 401 will operate upon the contents of control memory 400 rather than those of auxiliary control memory 402. Control memory WRITE control line 443 assumes its FALSE state in NORMAL status. Finally, RESET control line 438 is FALSE in all time slots.

When ACTIVE/NORMAL control line 437 becomes TRUE, operation of control logic module 403 assumes its active status, thereby becoming sensitive to changes on control action (CA) control lines 410, 411, and 412. The signals on these lines will be described in a three digit binary format. Thus the notation CA = 110 means that control action lines 410, 411, and 412 are respectively TRUE, TRUE, and FALSE.

When CA = 000, operation of control logic module 403 is the same as for NORMAL status just as if ACTIVE/NORMAL control line 437 were FALSE. Thus control logic module 403 is in this case allowed to act as if it were in its NORMAL status, even when ACTIVE status is demanded by signals present on ACTIVE/NORMAL control line 437.

When CA = 101, signals on A- Clock control line 440 and C- Clock control line 433 are interrupted in interframe time slots $\tau_1$ and $\tau_2$, just as was the case in NORMAL operation. The state of NORMAL/EXTEND control line 441 assumes, in each time slot, the same status as auxiliary control memory status bit control line 439, which selects normal (TRUE) or extended (FALSE) operation of the bilateral crosspoint stores in the controlled row. $T_0$ control line 409 remains FALSE. Control memory/auxiliary control memory control line 442 assumes its FALSE state, thereby directing decoder 401 to operate on the contents of auxiliary control memory 402. Control memory WRITE control line 443 assumes its FALSE state, so that no writing into control memory 402 takes place. RESET control line 438 remains in its FALSE state.

When CA = 110, operation of control logic module 403 is exactly the same as the operation for CA = 101, discussed above.

When CA = 100, signals on A-clock control line 440 and C-clock control line 433 are interrupted in interframe time slots $\tau_1$ and $\tau_2$, as before. NORMAL/EXTEND control line 441 is in its TRUE state, dictating normal operation of the bilateral crosspoint stores in the controller row. $T_0$ control line 409 remains FALSE. Control memory/auxiliary control memory control line 442 assumes its FALSE state, directing decoder 401 to operate on the contents of auxiliary control memory 402. Control memory WRITE control line 443 assumes its FALSE state. RESET control line 438 remains in its FALSE state.

When CA = 111 in the call setup mode, signals on A-clock control line 440 and C-clock control line 443 are again interrupted in interframe time slots $\tau_1$ and $\tau_2$. NORMAL/EXTEND control line 441 is in its TRUE state. $T_0$ control line 409 remains FALSE. Control memory/auxiliary control memory control line 442 assumes its FALSE state. Control memory WRITE control line 443 assumes its TRUE state, thereby causing the contents of auxliary control memory 402 to be loaded into control memory 400. Reset control line 438 remains in its FALSE state.

The final status of control action lines 410, 411, and 412 in the call setup mode is CA = 011. In this case, signals on A-clock control line 440 and C-clock control line 433 are interrupted in both interframe time slots $\tau_1$ and $\tau_2$, as before. NORMAL/EXTEND control line 441 assumes its TRUE state, dictating normal operation of the bilateral crosspoint stores in the controlled row. $T_0$ control line 409 remains FALSE. Control memory/auxiliary control memory control line 442 returns to its TRUE state, thereby calling for the decoding of the contents of control memory 400. Control memory WRITE control line 443 returns to its FALSE state. Finally, reset control line 438 assumes its TRUE state, thereby resetting function register 404 to normal status.

This completes the discussion of the operation of control logic module 403 in its call setup mode. When SETUP/RELEASE control line 436 assumes its FALSE state control logic module 403 operates in the call release mode. The various activities of control logic module 403 in the call release mode will not be discussed in the same detail as for the call setup mode. Instead, only the differences from the call setup mode will be pointed out. Unless otherwise specified, operation in the call release mode is assumed to be the same as operation in the call setup mode.

The signals on A-clock control line 440 and C-clock control line 433 are exactly the same as for the call setup mode with one exception. For CA = 101 and CA = 110, A-clock control line 440 is interrupted only in interframe time slot $\tau_1$ and not in $\tau_2$. $T_0$ control line 409, for CA = 101 and CA = 110, becomes TRUE only in interframe time slot $\tau_2$, otherwise remaining FALSE as was the case throughout the call setup mode. These are the only differences in the call setup mode and the call release mode.

FIG. 17 is a chart summarizing the activities of control logic module 403 described above. This chart can be looked upon as specifying necessary design criteria for any alternative embodiment (e.g., read only memory) which might be used in place of the detailed circuitry of FIG. 16.

It is now appropriate to proceed to FIG. 11 for a discussion of the second type of local control entity used for control of the switching network. FIG. 11 illustrates a local control entity 15 controlling the stores of one column of bilateral switching matrix 10-1 together with the stores of the corresponding row of bilateral switching network 20-1. (This correspondence is defined by the manner in which the switching matrices are interconnected by highways 51-1 and 51-2. The interconnection of switching matrices was discussed in connection with FIG. 6.) Each row of a second, third, or fourth stage switching matrix, as shown in FIG. 6, thus has associated with it a local control entity identical to local control entity 15 of FIG. 12. This local control entity controls the bilateral crosspoint stores in the associated row, via A-clock line 480, which is bussed in common to all stores in that row. The same local control entity also controls the bilateral crosspoint stores in the column of the previous stage switching matrix to which the stores in the aofrementioned row are connected by interstage highways. The latter stores are controlled via B-clock line 482, which is bussed in common to all stores in the controlled column.

Figure 19:
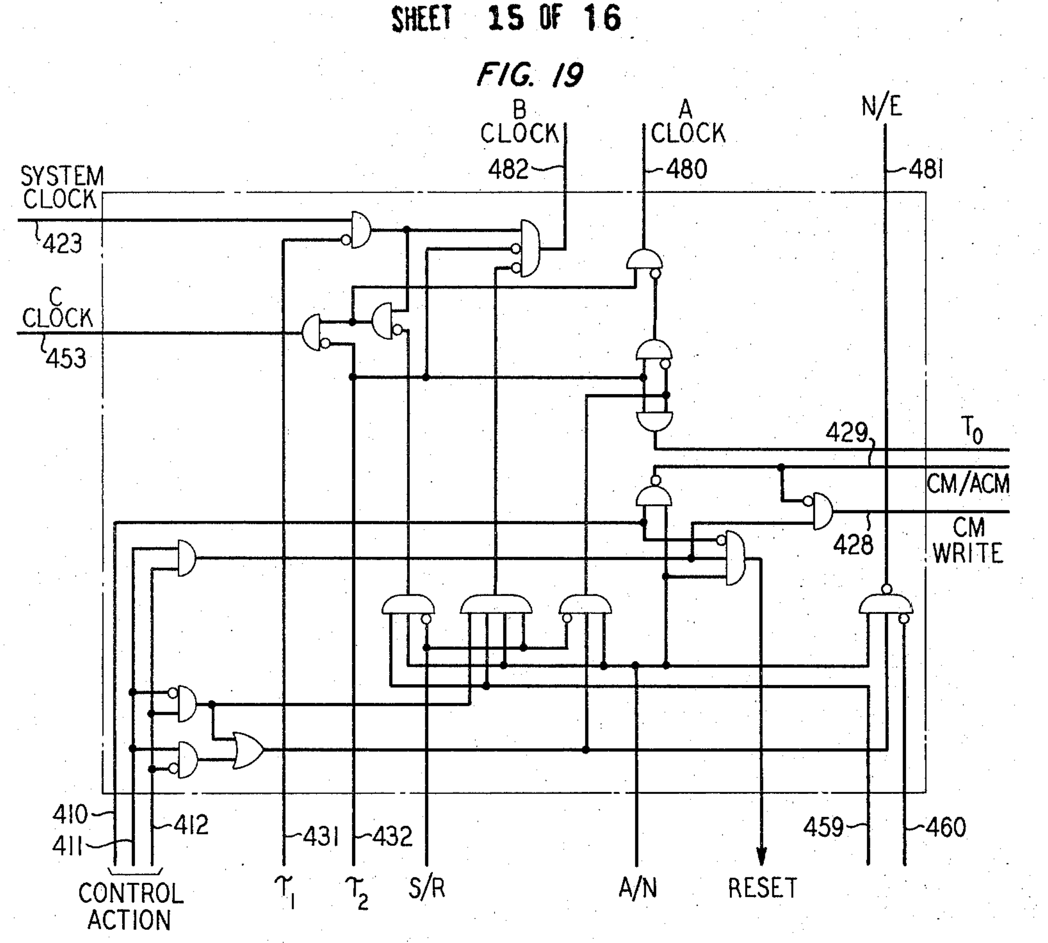
FIG. 19 shows typical circuitry for implementing the control logic functions of the circuit of FIG. 11.

Control logic module 423 of FIG. 11 functions in much the same manner as control logic module 403, previously discussed with reference to FIG. 10. The main differences are in the inclusion of a B-clock line 482 and a second auxiliary control memory status bit control line 460, along with the first auxiliary control memory status bit control line 459, which latter control line corresponds to control line 439 of FIG. 10. During call setup, when CA = 101, the clock pulses on B-clock line 482 are interrupted in accordance with the signals on second auxiliary control memory status bit control line 460. (The clock pulses on B-clock line 482 are always interrupted in interframe time slots $\tau_1$ and $\tau_2$.) During call release, when CA = 101, the clock pulses on A-clock line 480 and on C-clock line 453 are interrupted in accordance with the signals on second auxiliary control memory control line 460. These are essentially the only ways in which the operation of control logic module 423 of FIG. 11 differs from the previously explained operation of control logic module 403. Therefore, the operation of control logic module 423 will not be explained in detail. FIG. 18 presents a chart summarizing the activities of control logic module 423 in exactly the same way in which the chart of FIG. 17 summarized the activities of control logic module 403. FIG. 19 illustrates typical logic circuitry used to implement the functions of control logic module 423. As before, of course, other embodiments, including read-only memory, could also be realized.

With the exception of the differences in operation of control logic module 423 heretofore described, the remainder of local control entity 15 (FIG. 11) functions in exactly the same manner as local control entity 13, previously described with reference to FIG. 10.

The two types of local control entities used to control rows of bilateral crosspoint stores in the switching network have now been described. It is now appropriate to consider in some detail the bilateral crosspoint stores themselves. As was pointed out previously, these bilateral crosspoint stores operate on essentially the same principles as those disclosed in my copending application Ser. No. 243,640. They do, however, incorporate several modifications designed to enable them to cooperate effectively with the control entities described with reference to FIGS. 10 and 11, thereby allowing error-free performance during call setup and release operations.

Figure 12:
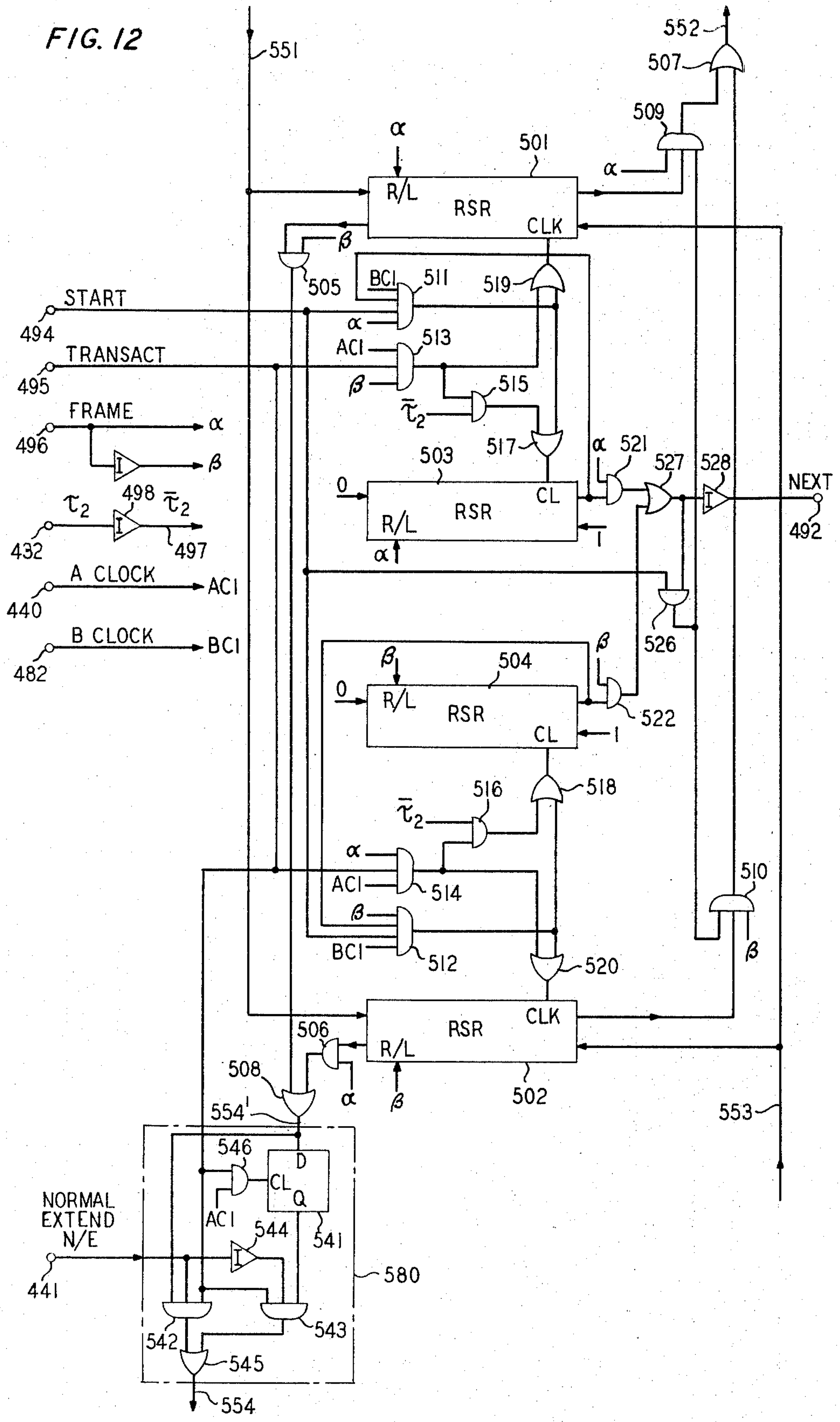
FIG. 12 shows an improved bilateral store in accordance with one embodiment of the present invention.

FIG. 12 shows in detail a bilateral crosspoint store constructed according to the teachings of this invention. The particular designations chosen for the data and control lines of the bilateral crosspoint store shown in FIG. 12 are those of bilateral crosspoint store 205-1, previously seen in FIGS. 10 and 11 as an element of bilateral switching matrix 10-1. Of course, all bilateral crosspoint stores in the network are identical, and the description to follow applies to any of them, the particular numerical designations to bilateral crosspoint store 205-1 being chosen only for purposes of convenience.

The major components in bilateral crosspoint store 205-1 are four reversible shift registers 501, 502, 503 and 504. The basic function of shift registers 501 and 502 is to receive and store bits from input lines 551 and 553 and to transmit the stored bits in a subsequent frame to output lines 552 and 554. The basic function of shift registers 503 and 504 is to keep a running tally of the number of bits stored in each of reversible shift registers 501 and 502. Shift registers 503 and 504 replace the updown counters used to perform the same function in my aforementioned application, Ser. No. 243,640.

The principles of design applicable to shift registers 501, 502, 503, and 504 are well known. Shift registers, including reversible and other multimode registers, are described, for example, in *Manual of Logic Circuits*, by G. A. Maley, Prentice-Hall (1970), pp. 126 ff.

In accordance with this invention, a desirable hardware economy in bilateral crosspoint store 205-1 is achieved through interchanging the roles of reversible shift registers 501 and 502 and also of reversible shift registers 503 and 504 in alternate frames. In order to effect this interchange of roles a FRAME signal is provided on terminal 496. This signal is alternately TRUE and FALSE in successive frames. An inverter is provided so that an inverted ($\overline{\text{FRAME}}$) signal is provided. The leads bearing the FRAME and $\overline{\text{FRAME}}$ signals are labeled $\alpha$ and $\beta$, respectively. The alternation of these signals takes place at the beginning of each interframe time slot $\tau_1$. The $\alpha$ and $\beta$ signal waveforms are illustrated in FIG. 15.

Signals $\alpha$ and $\beta$ are applied at various locations throughout bilateral crosspoint store 205-1 in order to effect the interchanges of role of the reversible shift registers.

In the frames during which $\alpha$ is TRUE, reversible shift register 501 receives bits from input line 551 and transmits bits to output line 552. It should be remembered that the bits received from input line 551 are not transmitted to output line 552 in the same frame, or in fact at all. Instead the bits received from input line 551 are routed to output line 554 in a later frame, and the bits transmitted to output line 552 are received from input line 553 in an earlier frame. Input and output lines 551 and 552 are adapted to be connected to time slot interchanger side input and output highways. As noted in the description of FIGS. 4 and 8, the input and output interactions with these highways proceed from one bilateral crosspoint store to the next, down each column in a switch, as the successive START terminals of each store are activated. Accordingly reversible shift register 501 receives clock pulses at its clock input terminal CLK only when START terminal 494 and B CLOCK terminal 482 are activated. During the frames in which $\alpha$ is TRUE, reversible shift register 501 shifts right upon the application of each clock pulse at its terminal CLK.

As was noted above, reversible shift register 503 keeps a running tally of the number of bits stored in reversible shift register 501. In each frame during which $\alpha$ is TRUE this shift register shifts right, inputting a '0' at its leftmost stage upon each application of a pulse at its clock input terminal CL. These clock pulses are applied, in frames in which $\alpha$ is TRUE, only when both START input terminal 494 and B CLOCK input terminal 482 are TRUE.

Meanwhile reversible shift register 502, in the frames in which $\alpha$ is TRUE, receives bits from line 553 and transmits other bits to line 554 via the extending circuitry 580 to be discussed later. As previously indicated in connection with FIG. 8, the bits received from line 553 are not themselves transmitted to line 554 but instead are transmitted in a later frame to output line 552. Likewise the bits transmitted to line 554 are received in an earlier frame from input line 551. Input and output lines 553 and 554 are adapted to be connected to line unit highway side input and output highways. The input and output interactions with these highways are directed by a local control entity (e.g., local control entity 13 as shown in FIG. 10 in the case of store 205-1) through the application of signals to TRANSACT control terminal 495. Therefore reversible shift register 502 has clock pulses applied to its clock terminal CLK only when both TRANSACT terminal 495 and A CLOCK terminal 440 are simultaneously TRUE. Shift register 502 shifts left upon the application of each of these clock pulses.

Meanwhile shift register 504 shifts left upon the application of each clock pulse to its clock input terminal CL, inputting a '1' at its rightmost stage. These clock pulses are essentially the same as those applied to clock input terminal CLK of shift register 501, except that they are inhibited in interframe time slot $\tau_2$ by the $\bar{\tau}_2$ input to gate 516. It is the function of reversible shift register 504 to determine the total number of bits stored in reversible shift register 502 from input line 553 during the frames for which $\alpha$ is TRUE.

Having described the major roles played by each of the reversible shift registers during the frames for which $\alpha$ is TRUE, the roles played by these same components when $\beta$ is TRUE must next be considered. The roles of the reversible shift registers 501 and 502 are essentially reversed, as are the roles of reversible shift register 503 and 504. Reversible shift register 501 receives bits from line 553 and transmits bits to output line 554. It shifts left upon the application of each pulse to its clock input terminal CLK. These pulses are applied when both TRANSACT terminal 495 and A CLOCK terminal 440 are simultaneously TRUE.

Reversible shift register 502, on the other hand, receives bits from input line 551 and transmits bits to output line 552. It shifts right upon the application of each pulse to its clock input terminal CLK. These pulses occur only when START input terminal 494 and B CLOCK terminal 482 are TRUE.

Reversible shift register 503 shifts left upon the application of each pulse to its clock input terminal CL, inputting a '0' at its leftmost stage. Such clock pulses are applied whenever both TRANSACT terminal 495 and A CLOCK terminal 440 are TRUE simultaneously, unless this occurs in interframe time slot $\tau_2$. Reversible shift register 504 shifts right upon the application of each clock pulse to its clock input terminal CL, inputting a '0' at its leftmost stage. Such clock pulses are applied whenever both START terminal 494 and B CLOCK terminal 482 are simultaneously TRUE.

Now that the basic functions of reversible shift registers 501, 502, 503 and 504 have been defined, only the gating circuitry which directs the operation of these components remains to be described.

First, the gating circuitry which connects reversible shift registers 501 and 502 to the appropriate input and output lines will be considered. Input line 551 is connected both to the left input lead of reversible shift register 501 and to the left input lead of reversible shift register 502. However, only the one of these shift registers which is enabled to shift in the right direction may receive bits from input line 551 in any given frame. The bits on input line 551 are ignored by the shift register which is left-enabled. This is accomplished by explicit gating of standard design or simply by reason of the fact that there is no place for the input bits to be shifted to when the shift register is left-enabled.

Likewise, input line 553 is connected both to the right input lead of reversible shift register 501 and to the right input lead of reversible shift register 502. Only the one of these shift registers which is right-enabled may receive bits from input line 553 in any given frame. The bits on input line 553 are ignored by the shift register which is left-enabled.

Output line 554 is connected through extender 580 to line 554'. Extender 580, to be discussed in more detail later, has as its purpose providing a selectable single time slot delay between the signals on output line 554' and output line 554. For the present, extender 580 will be neglected, and the derivation of the undelayed signals on line 554' will be considered. Line 554' is connected through OR gate 508 to AND gates 505 and 506. These AND gates in turn receive bits from the left output leads of reversible shift registers 501 and 502. By virtue of $\alpha$ and $\beta$ signal inputs to these AND gates, only AND gate 506 may be enabled in a frame in which $\alpha$ is TRUE, and only AND gate 505 may be enabled in a frame in which $\beta$ is TRUE. Thus selection of which of shift registers 501 and 502 is to transmit bits to line 554', and ultimately to output line 554, is accomplished.

Now considering the circuitry of extender 580, it may be noted that the signal path from line 554' to output line 554 takes alternate branches through AND gates 542 and 543. Each of these AND gates 542 and 543 also has an input lead connected to TRANSACT terminal 495. Therefore neither of these gates can be enabled unless TRANSACT terminal 495 is TRUE. This fact is consistent with the earlier statement that output operations on the line unit highway side of a bilateral crosspoint store are governed by signals supplied from an associated decoder to the TRANSACT terminal of that store. Gates 542 and 543 insure that an output bit from one of shift registers 501 and 502 can reach output line 554 only if TRANSACT terminal 495 is TRUE Line 554' is connected directly to an input of AND gate 542, while the path from line 554' to the input of AND gate 543 passes through delay flip-flop 541. The former route is the data path for normal (undelayed) operation of extender 580, while the latter route is the data path for extended (single-time-slot-delayed) operation. It is seen that a TRUE signal on NORMAL/EXTEND terminal 441 will allow enablement of AND gate 542 and at the same time will inhibit AND gate 543 through inverter 544. Contrariwise, a FALSE signal on NORMAL/EXTEND terminal 441 will allow enablement of AND gate 543 and at the same time will inhibit AND gate 542. Clearly then, TRUE and FALSE signals on NORMAL/EXTEND terminal 441 provide for normal and extended operation of extender 580, respectively.

The single time slot delay for extended operation is provided by delay flip-flop 541 in a straightforward manner. Data bits are provided to the D input of this flip-flop from line 554'. Previously stored data bits are transmitted, after a single time slot delay, via the Q output terminal to an input of AND gate 543. Clock pulses are applied to the clock input CL of flip-flop 541 from the output of AND gate 546. AND gate 546 receives inputs from A CLOCK terminal 440 and from TRANSACT terminal 495. It may be easily verified that the signals provided to clock input CL of flip-flop 541 correspond exactly to the clock signals applied to the one of shift registers 501 and 502 which is left-enabled and thus involved in transmitting data bits to output line 554.

The final circuit element in extender 580 is OR gate 545. OR gate 545 simply interconnects the outputs of the two AND gates 542 and 543 to output line 554, thus joining the two mutually exclusive data paths for normal and extended operation.

Output line 552 is connected through OR gate 507 to AND gates 509 and 510. These AND gates in turn receive bits from the right output lead of shift register 501 and the right output lead of shift register 502, respectively. By virtue of $\alpha$ and $\beta$ signals applied to inputs of these AND gates, only AND gate 509 may be enabled in a frame in which $\alpha$ is TRUE, and only AND gate 510 may be enabled in a frame in which $\beta$ is TRUE. Each of AND gates 509 and 510 also has an input lead connected to the output of AND gate 526. AND gate 526 has one input from START terminal 494 and another input from the output of OR gate 527. As will be seen in more detail below, OR gate 527 provides a TRUE output only when either (1) shift register 503 indicates, by a "1" in its rightmost stage during a frame for which $\alpha$ is TRUE, that shift register 501 has not yet exhausted the supply of bits it is transmitting to output line 552; or (2) shift register 504 indicates by a '1' in its rightmost stage during a frame for which $\beta$ is TRUE, that shift register 502 has not yet exhausted the supply of data bits it is transmitting to output line 552. Therefore, AND gate 526 provides a TRUE output only when both (a) START terminal 494 is TRUE and (b) the shift register presently enabled to transmit data bits to time slot interchanger side output line 552 has not exhausted the supply of bits, stored in the previous frame from line unit highway side input line 553, that are being transmitted to output line 552 in the current frame. This fact is consistent with the earlier observations made in connection with the discussion of FIGS. 4 and 8, that bits are transmitted to the time slot interchanger side of each store only as the respective START terminals become true, and that this transmission continues until the supply of data bits stored in the previous frame from the line unit highway side input line becomes exhausted.

In the discussion of the circuitry of FIG. 12 undertaken up to this point, the connection of reversible shift registers 501 and 502 to input lines 551 and 553 and output lines 552 and 554 has been considered. Now it is appropriate to consider further the gating circuitry which determines the time slots in which pulses are applied to clock inputs CLK of shift registers 501 and 502 and to clock inputs CL of shift registers 503 and 504.

Clock pulses are applied to clock input CLK of shift register 501 through OR gate 519. One of the two inputs to OR gate 519 is derived from the output of AND gate 511. As can be seen, AND gate 511 can be enabled in a frame in which $\alpha$ is TRUE by the concurrence of a TRUE input on START terminal 494 and a clock pulse on B CLOCK terminal 482.

The remaining input to OR gate 519 is derived from the output of AND gate 513. As can be seen, AND gate 513 can be enabled in a frame in which $\beta$ is TRUE by the concurrence of a TRUE input on TRANSACT terminal 495 and a clock pulse on A CLOCK.

Clock pulses to clock input CL of shift register 503 are applied from the output of OR gate 517. One of the two inputs to OR gate 517 is derived from the output of AND gate 511. The other input is from the output of AND gate 515. This latter gate takes its two inputs from the output of AND gate 513 and from interframe time slot line 497. Interframe time slot line 497 is derived through inverter 498 from interframe time slot line 432 (seen previously in FIGS. 10 and 11), and is therefore TRUE in all time slots except interframe time slot $\tau_2$. The consequence of these gating arrangements is that shift register 503 receives a clock pulse in each time slot in which its companion shift register 501 receives a clock pulse, except if that time slot is interframe time slot $\tau_2$ when $\beta$ is TRUE.

Turning now to shift register 502, clock pulses are applied to its clock input CLK through OR gate 520. One of the two inputs to OR gate 520 is derived from the output of AND gate 512. As can be seen, AND gate 512 can be enabled in a frame in which $\beta$ is TRUE by the occurrence of a TRUE input on START terminal 494 and a clock pulse on B CLOCK terminal 482.

The remaining input to OR gate 520 is derived from the output of AND gate 514. As can be seen, AND gate 514 can be enabled in a frame in which $\alpha$ is TRUE by the concurrence of a TRUE input on TRANSACT terminal 495 and a clock pulse on A-CLOCK terminal 440.

Clock pulses to clock input CL of shift register 504 are applied through OR gate 518. One of the two inputs to OR gate 518 is derived from the output of AND gate 512, previously discussed. The other input is from the output of AND gate 516. This latter gate takes its two inputs from the output of AND gate 514 and from interframe time slot line 497. Thus shift register 504 receives a clock pulse in each time slot in which its companion shift register 502 receives a clock pulse, except in the interframe time slots $\tau_2$ succeeding a frame for which $\alpha$ is TRUE.

This completes the discussion of the circuitry which provides clock pulses to shift registers 501, 502, 503, and 504. We now turn to the circuitry associated with the outputs of shift registers 503 and 504 and with signalling on NEXT terminal 492.

AND gates 521 and 522, together with OR gate 527 provide for signalling on NEXT terminal 492. NEXT terminal 492 is connected through inverter 528 to the output of OR gate 527. One of the two inputs of OR gate 527 is connected to the output of AND gate 521 and the other is connected to the output of AND gate 522. In frames during which $\alpha$ is TRUE, AND gate 521 is enabled when the output of shift register 503 (at its rightmost stage) is TRUE. In frames during which $\beta$ is TRUE, AND gate 522 is enabled when the output of shift register 504 (at its rightmost stage) is TRUE. The enablement of either of AND gates 521 or 522 provides, through OR gate 527 and inverter 528, a FALSE signal on NEXT terminal 492. Otherwise, a TRUE signal is provided at NEXT terminal 492.

The above explained operation of gates 521, 522, and 527 is consistent with the required provision of signals on NEXT terminal 492 when the bilateral crosspoint store is considered as operating in the switch previously discussed with reference to FIG. 8. When $\alpha$ is TRUE, shift register 501 transmits data bits on output line 552 to a time slot interchanger side output highway. When shift register 503, shifting to the right in each time slot, first reaches the state in which a '0' appears in its rightmost stage, the exhaustion of these bits is indicated, and a TRUE signal on NEXT terminal 492 is then provided to signal the store immediately below in the switch to begin transmission of bits to the common time slot interchanger side output highway. Similarly, when $\beta$ is TRUE, shift register 502 transmits data bits on output line 552 to a time slot interchanger side output highway. When shift register 504, shifting to the right in each time slot, first reaches the state in which a '0' appears at its rightmost stage, the exhaustion of these latter data bits is indicated, and a TRUE signal is provided on NEXT terminal 492.

The right outputs of shift registers 503 and 504 are also seen to be connected as inputs to respective AND gates 511 and 512, thereby controlling the supply of clock pulses delivered to the CLK terminals of respective shift registers 501, 502, 503 and 504. Thus when, upon right shifting, the end of the sequence of 1's stored in shift registers 503 and 504 (to "count" the data bits stored in associated registers 501 and 502) is detected, the supply of clock pulses to these latter shift registers is terminated. That is, since it has been determined that the shift registers 501 and 502 were "empty," no more outputting of data is appropriate.

The above-detailed discussion of FIG. 12 makes it clear that the bilateral crosspoint store shown therein is suitable for inclusion in the bilateral crosspoint switch of FIG. 8. It is also clear however, that the present invention is not restricted to the particular component interconnections of FIG. 12. As will be appreciated by those skilled in the art, there exist functionally equivalent logic designs which may be substituted for that bilateral crosspoint store which will still enable the switch of FIG. 8 to perform identical time slot interchanges.

It is now appropriate to proceed to FIG. 13 for a discussion of the third type of local control entity, which is used for control of the bilateral time slot interchangers. FIG. 13 shows a bilateral time slot interchanger 75, together with an associated local control entity 17 and the last-stage switching matrix 40-1 to which time slot interchanger 75 is connected via input and output highways 60-1, 60-2, 60-3, and 60-4.

It will be recalled that the function of bilateral time slot interchanger 75 is to provide time slot interchangeable coupling between highways 60-1 and 60-4 and complementary time slot interchangeable coupling between highways 60-3 and 60-2. Control entity 17 provides control signals to bilateral time slot interchanger 75 via control line group 750, via A1-Clock line 618, A2-Clock line 619, and A3-Clock line 620, and via NORMAL/EXTEND 1 control line 780 and NORMAL/EXTEND 2 control line 781. Control entity 17 also provides control signals to switching matrix 40-1 via B1-Clock line 782, which is bussed in common to all crosspoint stores in the column corresponding to highways 60-1 and 60-2, and also via B2-Clock line 783, which is bussed in common to all crosspoint stores in the column corresponding to highways 60-3 and 60-4.

Local control entity 7 itself will be seen to be quite similar to local control entities 13 and 15, discussed with reference to FIGS. 10 and 11, respectively. To the extent that differences are not pointed out in the discussion to follow, its operation will be assumed to be the same as that of local control entity 13, which was discussed in detail with reference to FIG. 10. In particular, it may be noted that function register 704 and time slot counter 705 are exactly identical to the corresponding components in FIG. 10. The only difference in the operation of these two components from that set forth in connection with FIG. 10 is that time slot counter 705 receives an input not from C-clock line 433, as in FIG. 10, but from A1-clock line 618.

Control memory 700, auxiliary control memory 702, decoder 701, and memory input/output unit 706 all serve essentially the same purpose as the corresponding components of FIG. 10. The work length for the stored words may be different since the information carried in each memory word in FIG. 13 must be sufficient to select one particular stage in bilateral time slot interchanger 75, whereas the memory work length in FIG. 10 was determined by the requirement that there be enough information to specify one particular crosspoint store in a row of such stores. It is clear then that, in general, the work lengths will be different. Auxiliary control memory 702 contains two extra status bits for each word. Control lines 739 and 740 indicate the values of these status bits for the auxiliary control memory word currently being accessed.

Control logic module 703 is similar to the control logic modules 403 and 423 of FIGS. 10 and 11. It receives clock pulses from system clock line 430 and signals an interframe time slot control lines 431 and 432, just as do the other control logic modules. Communication between control logic module 703 and the central processor via function register 704 is the same as that previously discussed with respect to FIGS. 10 and 11.

Control signals are applied to control logic module 703 via CONTROL ACTION lines 710, 711, and 712. These control lines are bussed in common to all control logic modules in local control entities controlling bilateral time slot interchangers. It should be noted that CONTROL ACTION lines 710, 711, and 712 are not the same as CONTROL ACTION lines 410, 411, and 412, which are bussed in common to all control logic modules in local control entities controlling bilateral crosspoint stores, as discussed with reference to FIGS. 10 and 11.

Control logic modules 703 has several outputs. B1-clock line 782 provides a clock signal to the B-clock terminals of all of the bilateral crosspoint stores in the column of crosspoint switching matrix 40-1 served by input and output highways 60-1 and 60-2. B2-clock line 783 provides a clock signal to the B-clock terminals of all of the bilateral crosspoint stores in the column of switching matrix 40-1 served by input and output highways 60-3 and 60-4. NORMAL/EXTEND-1 control line 780, NORMAL/EXTEND-2 control line 781, A1-clock line 618, A2-clock line 619, and A3-clock line 620 provide control and clock signals to bilateral time slot interchanger 75. The nature and purpose of these control and clock signals will be described below with reference to FIG. 14, when the detailed circuitry of bilateral time slot interchanger 73 is considered.

Control logic module 703 also provides control signals on control memory/auxiliary control memory control line 760 and on control memory WRITE control line 761. It is noted that no $T_0$ control line of the type contained in the control entities previously discussed is present here. Instead interframe time slot control line 431 provides an input to decoder 701 in the place occupied by the $T_0$ control lines in the previously discussed control entities. When interframe time slot line 431 is in its TRUE state (during interframe time slot $\tau_1$) decoder 701 is directed to perform the special operation of making all of the lines in the group 750 TRUE simultaneously in that time slot.

Figure 21:
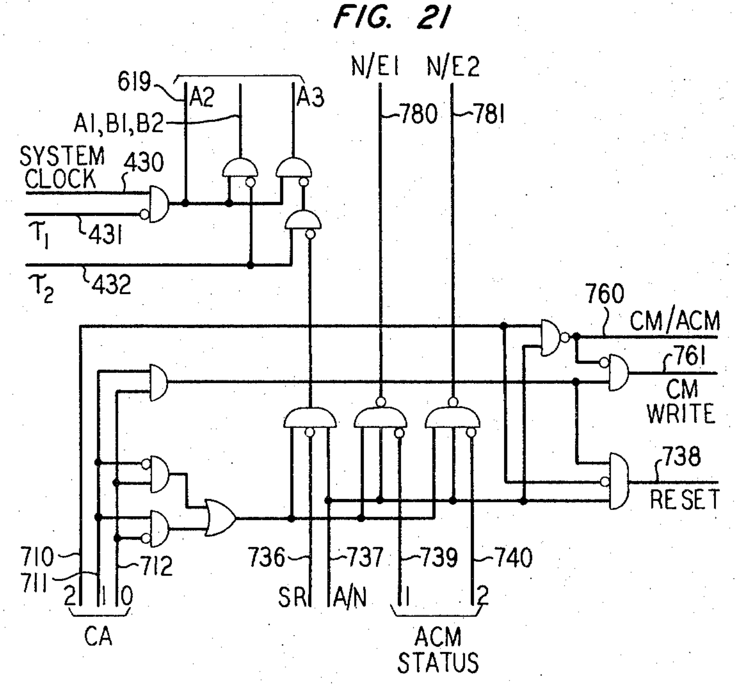
FIG. 21 is a typical circuit for implementing control functions in the circuit of FIG. 13.

Control logic module 703 can be realized using conventional logic circuitry or read-only memory, just as in the case of the previously discussed types of control logic modules. FIG. 20 is a chart specifying the required input/output relations for control logic module 703 in functional terms. These relations should be clear and they will not be repeated in words, as was previously done for the two other types of control logic modules. FIG. 21 illustrates a typical embodiment of control logic module 703 using conventional combinational logic. The reasons for the particular input/output relations required of control logic module 703 will become clear in the discussion of detailed call setup and release procedures which is to follow later. Note that the A1, B1 and B2 clock signals are generated on a single lead. This lead is then distributed to the individual clock lead as required.

It is of course understood that each time slot interchanger in the entire switching system will have associated with it a local control entity of the type exemplified by control entity 17 of FIG. 13.

FIG. 14 shows a bilateral time slot interchanger 75 constructed according to the teachings of this invention. The design and operation of this apparatus is in most respects similar to that described in my previously cited copending application Ser. No. 214,144.

The purpose of bilateral time slot interchanger 75 is to provide time slot interchangeable coupling between input lead 60-1 and output lead 60-4 and complementary time slot interchangeable coupling between input lead 60-3 and output lead 60-2. Referring momemtarily back to FIG. 6, it is seen that these input and output leads appear as output and input highways, respectively, to the fourth stage switching matrix 40-1. It is to be understood that one additional bilateral time slot interchanger is to be provided for connection in like manner to each quadruple (pairs of pairs) of input and output highways in the switching matrices of the final stage of the switching network.

The operation of bilateral time slot interchanger 75 is straightforward in view of the discussion in my copending application Ser. No. 214,144, incorporated by reference herein, and in light of the remarks presented above, and will not be set forth in express detail here. The n-stage shift register 601, the delay flip-flops 603-1 through 603-n and the five gates associated with each flip-flop serve essentially the same functions as the corresponding components in the latter mentioned copending application. The *n*-stage shift registers 604 and 605 provide one-frame delays in the input path from input lead 60-3 and in the output path to output lead 60-4 in the same manner as their counterparts in the latter-mentioned application. These delays are essential to insure proper timing of call setup and release functions. The two extender circuits comprising (1) delay flip-flop 606 and gates 608, 609 and 610, and (2) delay flip-flop 607 and gates 611, 612, and 613 provide selectable single time slot delays in the output paths to output leads 60-4 and 60-2. The operation of these extender circuits is the same as that of the extender circuit discussed previously with reference to FIG. 12. As was the case in FIG. 12, these extender circuits provide their single time slot delays only in selected time slots during call setup and release operations. Operation with no delay (normal) or with single time slot delay (extended) is determined by high or low level signals, respectively, on NORMAL/EXTEND control lines 780 and 781. NORMAL/EXTEND control lines 780 and 781 control the extender circuits in the output paths of output leads 60-4 and 60-2, respectively.

One difference between the bilateral time slot interchanger circuit illustrated in FIG. 14 and that of copending application 214, 144 is that in the circuit of FIG. 14, output leas 60-2 is derived from an additional n-stage shift register 602, instead of from *n*-stage shift register 601. Thus shift register 601 need not have a serial output and parallel inputs, as is required in the corresponding component of the latter copending application. Although this modification is not necessary from the standpoint of logical design at the level being discussed, it may be practically necessary if the time required to change the original *n*-stage shift register from serial to parallel mode is a significant portion of a time slot. If such were the case, an interframe period of four time slots might be required. (E.g., (1) mode change, (2) data exchange, (3) mode change, and (4) shift to extended operation if necessary.) By providing the additional n-stage shift register 602, the design of FIG. 14 avoids this problem. Since shift register 601 is simply parallel accessed via Q terminals on flip-flops 603-1 through **603-*n* and since shift register 602 is simply directly loaded, via gate circuits 616-1 through 616-*n***, through set and clear terminal pairs (S1, C1) through (S*n*, C*n*), no mode change is required for either shift register. Thus it is clear that an interframe period of only two time slots can easily be accommodated.

The only additional modifications in the time slot interchangers of copending application Ser. No. 214,144 which appear in the circuitry of FIG. 14 involve clock signals. The clocking signalling provisions of FIG. 14 are designed for increased versatility to easily accommodate call setup and release operations, without the necessity to drop or repeat data bits. The clock signal appearing on interframe time slot control line 431 assumes its high (TRUE) level only in interframe time slot $\tau_1$. When this occurs, it is seen that $n$-stage shift register 601 is allowed to dump its contents into flip-flops 603-1 through 603-$n$, while the input to these flip-flops from shift register 604 is inhibited. Also in interframe time slot $\tau_1$ the contents of flip-flops 603-1 through 603-$n$, available at the Q terminals of each flip-flop, are seen to be directly loaded into shift register 602 via gate circuits 616-1 through 616-$n$, to which interframe time slot control line 431 is connected as an enabling signal.

A1-clock line 618, A2-clock line 619, and A3-clock line 620 supply clock pulses which originate in control logic module 703, previously discussed with reference to FIG. 13.

A1-clock line 618 supplies clock signals at clock terminals CL of shift registers 601 and 604, which clock signals cause these shift registers to shift serially in the right direction. A2-clock line 619 supplies clock signals to the gating circuitry associated with flip-flops 603-1 through 603-$n$. Each occurrence of these latter clock signals causes each flip-flop to which a high level (TRUE) signal is applied on its corresponding TRANSACT control line 621-1 through 621-$n$ to toggle. A3-clock line 620 supplies clock pulses to $n$-stage shift registers 602 and 605, which cause these shift registers to shift serially in the left direction, A3-clock line 620 also supplies clock pulses to delay flip-flops 606 and 607 in the two extender circuits.

The multiplicity of clock lines in bilateral time slot interchanger 75 allow different logical components to be supplied with clock pulses in different sets of time slots. This flexibility allows call setup and release to proceed by adding and deleting signal bits which occur in the time slot corresponding to the added or deleted call. The exact context in which the signals on these clock lines are varied during call setup and release will be set forth more explicitly in the algorithmic description of call setup and release procedures which follows.

As a final note regarding bilateral time slot interchanger 75 of FIG. 14, it should be mentioned that the set of control lines 750 serves exactly the same function as does its counterpart in copending application Ser. No. 214,144. That is, these control lines select the one of flip-flops 603-1 through 603-$n$ which is to be clocked in each traffic time slot. In the interframe time slot $\tau_1$, all TRANSACT control lines are made TRUE, thereby allowing all flip-flops 603-1 through 603-$n$ to be clocked during the latter time slot.

Call Setup and Release Procedures

All of the components in the complete switching system designed according to the principles of this invention have now been presented. It will be apparent to those skilled in the art that the switching system described affords great flexibility for switching time division multiplexed data in an error free manner. To clarify even further the manner in which the switching system of this invention performs during call setup and release operations, a presentation of these operations in some detail will follow, with emphasis on the particular control entites, bilateral crosspoint stores, or bilateral time slot interchangers involved in each stage of those procedures.

The first step in a call setup operation is for the network central processor to identify the parties to be connected by their assigned highways (from the highway group 50 of FIG. 6) and time slots. Next a space-division path through the network of FIG. 6 for the new connection is determined by the central processor. (These central processor operations are substantially similar to those which take place in prior art switching systems. Their details do not form a part of the present invention.) Once the new path has been determined, the contents of the various control memories in each control entity serving the bilateral crosspoint stores and time slot interchangers involved in the new path are accessed by the processor. The processor operates on present control memory data together with the new path requirement to produce a set of auxiliary control memory contents for each auxiliary control memory corresponding to an accessed control memory. These auxiliary control memory contents include the ultimate contents that the corresponding control memories will possess when the call setup operation is complete and also additional status bits in each word which contain information required to effect call setup. (The general format of words for the control memories and auxiliary control memories, including the additional status bits in the latter, were introduced in the discussion of FIGS. 10, 11 and 13.). The auxiliary control memory contents for the new call are then preloaded into the auxiliary control memories (e.g., auxiliary control memories 402, 422, and 702, of FIGS. 10, 11 and 13) of each control entity controlling a store of interchanger involved in the new call. This loading is accomplished through the memory input/output units (e.g., units 406, 426, and 706 of FIGS. 10, 11, and 13) in each affected control entity. The loading may be verified by the processor for accuracy through the same input/output units. When correct loading of each involved auxiliary control memory has been verified, the function registers associated with the involved auxiliary control memories (e.g., function registers 404, 424, 704 of FIGS. 10, 11, and 13) are signalled by the processor to change status from NORMAL to ACTIVE as evidenced by TRUE signals on control lines 437, 457, and 737 of FIGS. 10, 11, and 13. These function registers are also signalled to go into their SETUP mode, as evidenced by TRUE signals on control lines 436, 456, and 736 in FIGS. 10, 11, and 13.

It may be well to recall at this point that all control logic modules in the network that are parts of control entities controlling crosspoint stores (one control entity to each row of stores in a switching matrix) are driven in common by three control action leads 410, 411, and 412. Only those control logic modules whose status is other than NORMAL, however, will respond to changes on these leads. A second group of control action leads 710, 711, and 712 serves in common all control logic modules associated with time slot interchangers, as shown in FIG. 13.

In order to accomplish a call setup operation in the switching network of FIG. 6, the control action leads 410, 411, and 412 which drive the control logic modules in the control entities which control the crosspoint stores are sequenced through several combinations of control signals. These combinations will be described in terms of the notation established for control action signals in the discussion of FIGS. 10 and 11. During a call setup operation, control action leads 410, 411, and 412 are sequenced, frame by frame as follows:

CA = 000

CA = 101

CA = 110

CA = 100

CA = 111

CA = 011

Normally each of these control action combinations lasts for one frame, with variations to be noted below.

A call setup operation will first be described with respect to a row of first stage crosspoint stores and its associated control entity, with particular reference to FIG. 10. In the first frame of a call setup operation, CA = 000, and operation of the various control logic modules involved in the operation is the same as if they were in normal, instead of active, status. It will be recalled that this implies that decoder 401 operates on control memory data. Also, A-clock line 440 is interrupted only during interframe time slots $\tau_1$ and $\tau_2$. Each reversible shift register pair (e.g., 501 and 502 of FIG. 12) interchanges roles between its members in interframe time slot $\tau_1$ and remains inactive during interframe time slot $\tau_2$. Time slot counter 405 is reset during interframe time slot $\tau_2$. (It will be recalled from the discussion of FIG. 10 that all time slot counters in the entire network are always reset during time slot $\tau_2$.)

At the beginning of interframe time slot $\tau_1$ preceding the next data frame, CONTROL ACTION lines 410, 411, and 412 are changed to CA = 101. (The signals on the CONTROL ACTION lines are never changed except at the beginning of interframe time slot $\tau_1$.) When CA = 101, decoder 401 operates on data from auxiliary control memory 402, as dictated by a low level (FALSE) control signal on control memory/auxiliary control memory control line 410. The additional status bit for each word in the auxiliary control memory determines, in each time slot, whether normal or extended operation is desired for the bilateral crosspoint store being designated by decoder 401 via TRANSACT control lines 450-1 through **450-*k*. (As mentioned previously, NORMAL/EXTEND control line 441** is used for this purpose. It is common to all bilateral crosspoint stores in the controlled row, because only one store in that first stage row is accessed in any given time slot.)

The value of the status bit in each auxiliary control memory word is such that extended output is taken from the crosspoint store involved in the new call for all time slots in which that store is selected subsequent to the time slot which the new call will actually occupy. Normal output will be used otherwise. The reason for this can be summarized in the following principle of operation for the first stage row in the frame for which CA = 101. The bilateral crosspoint store which is handling the data bit associated with the new call must receive that new bit in the shift register (501 or 502) which is receiving bits from line unit highway side input line 553. It must receive this bit in the time slot to be occupied by the new call. However, the bit at the output of this latter shift register is intended not for the new call, but for the existing call which formerly occupied the time slot to be used the new call. This latter existing call is transferred to the next time slot in which the involved store is selected by decoder 401. To accomplish this transfer, the bit intended for the latter existing call is stored in the extender 580 of the involved store, and all subsequent outputs from this store will be taken from extender 580. This is clearly a result of the sequence of auxiliary control memory status bits detailed in the preceding paragraph. The net effect is that a reversible shift register receives an altered frame, including a data bit for the new call from a line unit input highway and simultaneously delivers to the corresponding line unit output highway a correct frame, including a "stuffed" bit in the time slot assigned to the new call. (It may be noted that this "stuffed" bit does not contain genuine message data, since message data must travel through the network from the line unit input highway of the other party to the call, to the time slot interchangers and back through the network to the line unit output highway of the party being considered before it becomes available at the first stag line unit output highway now being discussed.)

In the next interframe time slot $\tau_1$ the control action lines 410, 411, and 412 change status to CA = 110. As before, clock signals on A-clock control line 440 are interrupted only in interframe time slots $\tau_1$ and $\tau_2$, and decoder 401 operates on the new data from auxiliary control memory 402. All other actions are the same as those taken in the preceding frame when CA = 101. The reason that identical operations are undertaken in the current frame is clear. When the reversible shift registers exchange roles in interframe time slot $\tau_1$, the reversible shift register which dealt with the frame altered by the addition of the new call in the previous frame will now contain bits from an unaltered frame of data. The pulse "stuffing" operation must then be repeated as the next altered frame of data enters this shift register from line unit highway side input line 553 of the involved store. After the two frames for which CA = 101 and CA = 110, extended operation of stores of no longer required, since all shift registers then receive and transmit only altered frames.

In the next interframe time slot $\tau_1$ the control action lines 410, 411, and 412 change status to CA = 100. Except for the fact that decoder 401 operates on data from auxiliary control memory 402, operation is otherwise the same as the previously described "normal" operation of CA = 000. (This may be readily verified by reference to FIG. 17.) Network continuity may then be tested by some means, while the control action lines 410, 411, and 412 are held at CA = 100 for as many frames as necessary to make satisfactory tests. If a loss in continuity is detected, control action lines 410, 411, and 412 are returned to CA = 000, and thus control by the contents of control memory 400 is restored. Network continuity would thus be restored, assuming no intervening mutilation of control memory data. A retrial of the call setup would then be begun.

As soon as continuity is established, control action lines 410, 411, and 412 are changed to CA = 111 for one frame, during which control memory WRITE control line 443 becomes TRUE, causing the contents of auxiliary control memory 402 to be loaded into control memory 400. Finally, control action lines 410, 411, and 412 assume the state CA = 011. In this state operation is normal except that RESET control line 438 becomes TRUE, resetting function register 404 to normal status.

This completes the description of that portion of a call setup operation which involves a first stage row of bilateral crosspoint stores and one associated control entity. As pointed out previously, the first stage row of switching matrix 10-1, together with control entity 13, as shown in FIG. 10, have been chosen for illustrative purpose. Usually, the two subscribers involved in a new call will be using separate line unit highways. Thus the above-described procedure will actually take place in two different first stage rows and in their corresponding control entities. It is also possible for the two subscribers to use the same first stage row (and line unit highways) as long as different crosspoint stores in that rwo are used to receive the bits corresponding to the two added calls. The same procedure applies in this latter case, with extended operation being elected for two stores in the time slot corresponding to the new call and thereafter. The two subscribers may not use the same first stage crosspoint store except as a last resort. To do so would usually cause momentary interference with some other subscribers on the involved line unit highway. This limitation could be eliminated by redesigning the bilateral crosspoint store of FIG. 12 to provide a two-bit extender capability instead of merely a one-bit capability.

That portion of a call setup operation which involves rows of crosspoint stores in other-than-first-stage switching matrices will now be described. These procedures, to be discussed with special reference to FIG. 11, will be seen to be quite similar to those just described for a first stage row of crosspoint stores connected to a subscriber line unit highway. With respect to the new procedures for the later stages, the only additional complication will be seen to be the necessity for interrupting the B-clock line of the preceding stage in a manner to be described. Since the procedures are so similar to those just described for first stage stores and their corresponding control entities, only the differences will be emphasized and explicitly detailed, it being otherwise assumed that the new procedures are the same as those just described.

In general, each stage is the switching network will have two bilateral crosspoint stores which are involved in carrying data signals corresponding to each of the two data paths through the network which must be established for that call. As may be seen in FIG. 11, each row of an other-than-first stage switching matrix (e.g., switching matrix 20-1) is controlled by a set of TRANSACT control lines, an A-clock line, and a NORMAL/EXTEND control line originating in a local control entity (e.g., control entity 15), in much the same manner as each first stage row was controlled in the discussion of FIG. 10. It should be noted, however, that the control entity 15 also exercises some control over the stores in the colume of the preceding stage to which the stores in the controlled row are connected. This latter control is exercised by means of B-clock line 482, which is bussed in common to all stores in the involved column of preceding stage 10-1. Drawing on this as an illustration, it may be stated generally that each control entity associated with a row of an other-than-first stage switching matrix also exercises a measure of control over the corresponding column in the preceding stage switching matrix.

The later stage call setup procedures will, as a result, be discussed in terms of a single local control entity, its associated controlled row, including the directly involved crosspoint store, and the associated previous stage controlled solumn, including its own directly involved crosspoint store. It is of course understood that there are in general two such groups of components in each other-than-first stage in which the procedures must be implemented, but since the procedures are identical for each group they will be stated only once. For purposes of illustration, control entity 15 is selected for discussion, together with a row of second stage switching matrix 20-1 and the corresponding column of first stage switching matrix 10-1. When it is necessary to refer to particular components in one of the two involved bilateral crosspoint stores, the numerical designation of the bilateral crosspoint store of FIG. 12 will be used for either or both of the two stores, with out regard for the previous explicit identification of the store of FIG. 12 as store 205-1 of switching matrix 10-1.

The sequence of control action line signals is, of course, the same as previously discussed, since control action lines 410, 411, and 412 are bussed to all control logic modules in the entire network. Thus when CA = 000, at the beginning of the call setup operation, control logic module 423 of FIG. 11 operates as if it were in its normal, instead of active, status.

In the interframe time slot preceding the next data frame, control action lines 410, 411, and 412 assume the state CA = 101. In this state decoder 421 operates on data from auxiliary control memory 422, as dictated by a low level (FALSE) signal on control line 429. Auxiliary control memory 422 provides two extra status bits per time slot which are available on control lines 459 and 460. The first status bit (on control line 459) selects normal or extended operation for the involved crosspoint store in the controlled row of switching matrix 20-1, in the same manner as described previously. This selection is accomplished via NORMAL/EXTEND control line 481. The second status bit (on control line 460) marks certain time slots in which the signals on B-clock line 482 are to be interrupted. This latter operation is indicated in FIG. 18 under "B-CLOCK INTERRUPT" for call setup by "$\tau_1$, $\tau_2$ as 2" (time slots $\tau_1$ and $\tau_2$ under the control of auxiliary memory states bit 2). The purpose of these procedures is readily apparent. The selection of normal or extended operation of stores in the controlled row of switching matrix 20-1 allows the selected bilateral crosspoint store, in the time slot to be occupied by the new call, to "stuff in" a bit and to retain an output bit in its extender 580 in exactly the same manner as described previously. The interruption of the clock pulses on B-clock line 482 takes place in the time slot to be occupied by the new call. This is necessary since the bilateral store in the involved column of previous stage switching matrix 10-1 must cease dumping bits to its time slot interchanger side output line 552 in the time slot to be occupied by the new call. This will leave room on interstage highway 51-1 in that time slot for the "stuffed" bit which is to be received by line unit highway side input line 553 of the involved row of switching matrix 20-1. The clock pulses on B-clock line 482 are resumed in the next time slot so that the data bit which was interrupted in its path on interstage highway 51-1 will reach the involved row of switching matrix 20-1 in that latter time slot, which is of course the new time slot assignment for the call previously occupying the time slot to be occupied by the new call. The particular bilateral crosspoint store of switching matrix 20-1 which receives this delayed data bit is of course designated by signals on the TRANSACT control lines during the time slot following that to be occupied by the new call. As before, the contents of auxiliary control memory 422 have been modified to reflect this change.

During interframe time slot $\tau_1$ of following this frame, control action lines 410, 411, and 412 change state to CA = 110. The clock pulses on A-clock control line 480 are interrupted during both interframe time slots $\tau_1$ and $\tau_2$, as before. All reversible shift register pairs (shown as 501 and 502 in FIG. 11) exchange roles in interframe time slot $\xi_1$ and remain inactive during interframe time slot $\xi_2$, also as before. When CA = 110 operation of control entity 15 is the same as just described for CA = 101, except that clock pulses on B-clock line 482 are not interrupted according to the value of the second status bits in auxiliary control memory 422. (These B-clock pulses are not interrupted at all for CA = 110, except during interframe time slots $\tau_1$ and $\tau_2$, in which they are always interrupted.) The reason that the B-clock pulses on line 482 are not interrupted in this frame is that after the shift registers have exchanged roles, the data frame then being transmitted from the previous stage column to the involved row of switching matrix 20-1 via interstage highway 51-1 already contains a stuffed frame, which the involved shift register in the involved column received in the previous frame from its own line unit highway side input line 553. The reason that normal and extended operation must continue to be selected by NORMAL/EXTEND control line 481 in the frame for which CA = 110 is the same as that discussed with respect to FIG. 10 for first stage control procedures when CA = 110. Essentially, the reversible shift register in the involved store of the involved row in switching matrix 20-1 which dealt with the frame altered by the addition of a new call being received from interstage highway 51-1 via its line unit highway side input line 553 in the previous frame will now contain bits from another unaltered frame of data. The pulse "stuffing" operation must then be repeated as the next altered frame of dta enters this shift register via line unit highway side input line 553 of the involved store. After the two frames for which CA = 101 and CA = 110, extended operation of the involved store in the involved row of switching matrix 20-1 is no longer required, since all shift registers in that store then receive and transmit only altered frames.

In the next interframe time slot $\tau_1$ the control action lines 410, 411, and 412 change status to CA = 100. Except for the fact that decoder 421 operates on data from auxiliary control memory 422, operation is otherwise the same as the previously described "normal" operation of CA = 000. (This may be readily verified by reference to (FIG. 18.) Network continuity may then be tested by some means, while the control action lines 410, 411, and 412 are held at CA = 100 for as many frames as necessary to make satisfactory tests. If a loss in continuity is detected, control action lines 410, 411, and 412 are returned to CA = 000, and thus control by the contents of control memory 420 is restored. Network continuity would thus be restored, assuming no intervening mutilation of control memory data. A retrial of the call setup would then be begun.

As soon as continuity is established, control action lines 410, 411, and 412 are changed to CA = 111 for one frame, during which control memory WRITE control line 480 becomes TRUE, causing the contents of auxiliary control memory 422 to be loaded into control memory 420. Finally, control action lines 410, 411 and 412 assume the state CA = 011. In this state operation is normal except that RESET control line 458 becomes TRUE, resetting function register 424 to normal status.

This completes the description of that portion of a call setup operation which involves a control entity associated with a later-than-first stage row of bilateral crosspoint stores and with a corresponding previous stage column of stores.

That portion of a call setup operation which involves bilateral time slot interchangers and their associated control entities will now be discussed. It is understood that each new call to be set up will involve one and only one bilateral time slot interchanger and its associated control entity. (This requirement can be interpreted symbolically with reference to FIG. 5, noting that both the space paths and the time paths for the two required connections for the call come together at the time slot interchanger bank 302.)

As noted previously a different set of CONTROL ACTION lines 710, 711, and 712 is bussed in common to all control entities of the type shown in FIG. 13. During a call setup operation these CONTROL ACTION lines are sequenced, in successive frames, through several states which when interpreted by control logic module 703 direct the operation of control entity 13. The states of CONTROL ACTION lines 710, 711, and 712 will be indicated by the abbreviated notation "CA' = " to distinguish them from the previously discussed CONTROL ACTION lines 410, 411, and 412, for which the notation "CA = " was used.

The sequence in which the status of CONTROL ACTION lines 410, 411 and 412 was previously discussed. This sequence is repeated below, alongside the sequence used for CONTROL ACTION lines 710, 711, 712.

| | |
|---|---|
| CA = 000 | CA' = 000 |
| CA = 101 | CA' = 000 |
| CA = 110 | CA' = 001 |
| CA = 100 | CA' = 110 |
| CA = 111 | CA' = 100 |
| CA = 011 | CA' = 111 |
| CA = 000 | CA' = 011 |

The actions taken during each status of CONTROL ACTION lines 710, 711, and 712 was detailed with reference to FIG. 20. References may be had to that figure, along with FIGS. 13 and 14, in the following detailed description of the call setup procedure.

When CA' = 000, operation is normal, decoder 701 operates on data from control memory 700, which contains unmodified data (i.e., without information relating to the new call). A1-clock line 618 and A3-clock line 620, along with B1-clock line 782 and B2-clock line 783 are all interrupted only during interframe time slots $\tau_1$ and $\tau_2$. A2-clock line 619 is interrupted only during interframe time slot $\tau_1$. A clock pulse must be present on A2-clock line 619 during interframe time slot $\tau_2$ since the flip-flops 603-1 through 603-*n* of FIG. 14 must be clocked during this time slot to effect the transfer of data between shift register 601 and the flip-flop 603-1 through **603-*n* and from flip-flops 603-1 through 603-n to shift register 602. All of control lines 750-1 through 750-*n* are made TRUE in interframe time slot $\tau_1$ by decoder 701 in order to enable the clock pulse on A2-clock line 619 to reach all of flip-flops 603-1 through 603-*n*** interframe time slot $\tau_1$.

CONTROL ACTION lines 710, 711 and 712 remain in the state CA'=000 until one frame after CONTROL ACTION lines 410, 411 and 412 are in the state CA=101. At the time CONTROL ACTION lines 710, 711 and 712 assume the status CA'=001. Since CA=101 in the preceding frame, shift registers 601 and 604 are both presented with altered or "stuffed" frames from last stage switching matrix 40-1. However, shift registers 602 and 605, connected to lines 60-2 and 60-4, still contain unaltered frames, with bit sequences corresponding to call information without the added call. Therefore, the outputs of shift registers 602 and 605 must be stuffed with a bit corresponding to the added call. This is done by extender flip-flops 606 and 607 under control of NORMAL/EXTEND-1 control line 780 and NORMAL/EXTEND-2 control line 781. These control lines 780 and 781 are, of course, directed by the two status bits in auxiliary control memory 702. It should be noted, however, that decoder 701 uses the contents of control memory 700, and not auxiliary control memory 702 to determine which lines of control line group 750 are activated in each time slot.

The net result of the activities set forth in the previous paragraph for the state CA'=001 is that during this frame, shift register 601 loads an altered frame from input line 60-1. Shift register 602 cooperates with the extender circuitry in its output line, directed by NORMAL/EXTEND-1 control line 780, to stuff a bit for the new call into the frame being delivered to line 60-2. Shift register 604 receives an altered frame from line 60-3, but delivers an unaltered frame to flip-flops 603-1 through **603-*n*. Shift register 605 receives an unaltered frame from flip-flops 603-*n*, but cooperates with the extender circuitry in its output line, directed by NORMAL/EXTEND-2 control line 781, to stuff a bit for the new call into the frame being delivered to line 60-4.**

During interframe time slot $\tau_1$, flip-flops 603-1 through **603-*n* receive an altered frame from shift register 601 and deliver an unaltered frame to shift register 602.** Interframe time slot $\tau_2$ is an idle time slot.

At the start of the next frame CA'=110. Since shift registers 602 and 605 both hold unaltered frames, they must again be "stuffed." However, flip-flop 603-1 through 603-n contain an altered frame, so data from auxiliary control memory 702 must be used to direct their operation. Operation for this frame then involves the decoding by decoder 701 of information read from auxiliary control memory 702. Shift registers 602 and 605 then each stuff a bit under control of the bits read from memory 702 on leads 739 and 740 to deliver altered output frames on respective leads 60-2 and 60-4. Flip-flops 603-1 through **603-*n* also deliver an altered frame to shift register 605.**

During $\tau_1$, flip-flops **603-*i* receive an altered frame from shift register 601 and deliver an altered frame to shift register 602. Shift registers 604 and 605** each contain altered frames at this time.

At the start of the next frame CA'=100 and the network continuity operations described above in connection with the crosspoint store control setup are performed. As before, this state may be maintained for as many frames as are necessary to make a determination of network continuity. Also as before, if a negative result is obtained the control sequence for the time slot interchanger is returned to state CA'=000.

If the test for continuity is positive, the next state assumed is CA'=111. This state is maintained for one frame during which time the contents of auxiliary control memory 702 are transferred to control memory 700. Finally, the CA'=011 state is assumed and the function register and circuitry controlled thereby are returned to the NORMAL state.

The system elements and their manner of interaction have also been designed to effect call release with equal facility by procedures analogous to those used for call setup. Because of their similarity to the setup procedures, release procedures will be discussed in somewhat less detail.

The first steps in call release are to identify the parties to be released by highway and time slot number and then to reconstruct the space-division path from path-memory data available to the processor. This is the same type of determination used in prior art systems, and forms no part of the present invention. Next the contents of the control memories serving the bilateral crosspoint matrices and the time slot interchangers involved are accessed. The processor operates on control memory data and path descriptions to extract the connnection to be abandoned and generate the contents to be stored in the auxiliary control memories. When corrct loading of the auxiliary memories is verified, the function registers associated with the auxiliary memories involved are signalled by the processor to change status from QN (don't care — Normal) to RA (Release Active).

It will again be useful to refer to FIGS. 10–14 and to the corresponding call setup procedure discussion presented above. The operation for the circuit of FIG. 10 will be considered first. So long as CA=000, operation remains normal in each control circuit as discussed above.

When CA=101 the reversible shift registers 501-504 exchange roles during $\tau_1$ and A clock is interrupted during $\tau_1$. B clock is *always* interrupted during both $\tau_1$ and $\tau_2$.

During $\tau_2$ all decoder leads **450-*i* are made TRUE so that the reversible shift register 501 in each crosspoint on the link is advanced one position, thereby loading its first output bit into its associated extender. Note that the "counter" shift registers 503** are prevented from advancing during $\tau_2$.

In this state (CA=101) the decoder operates on data from the auxiliary control memory. As before, the extra auxiliary memory bit per time slot determines whether normal or extended output from the bilateral crosspoint store is to be used. Normal output will be taken from the crosspoint store involved in the old call for all time slots subsequent to the time slot occupied by the old call. Extended output will be used otherwise for this crosspoint store and all other crosspoint stores on the link. The principle of operation is based on the fact that the crosspoint store involved in the old call must not input a bit during the time slot to be abandoned, but it must produce correct output during the next time slot to use the crosspoint store. This is done by "absorbing" the unwanted bit in the extender. Since the counter reversible shift register was not advanced during $\tau_2$, it will record loading of the altered (shortened) frame. Use of extended output in all other crosspoint stores simplifies control and does not interfere with correct data transaction.

At the start of the next frame the control action leads assume the state CA=110. While in this state, the operations for CA=101 are repeated At the start of the next frame the control action leads assume the state CA=100 and the actions outlined above for setup relating to continuity testing are performed.

Note that release of intrahighway calls (which normally use separate crosspoint stores for the two subscribers) is provided for. Momentary interference with some other subscribers on the same highway will occur if two subscribers had used the same crosspoint store.

The operation during call release of the circuit shown in FIG. 11 will now be described. While CA=000 operation remains normal as described above.

When CA=101 operation is as it was during call setup. During this input state two extra bits per time slot are provided by the auxiliary control memory. One selects normal or extended output from the crosspoint stores. The other marks time slots in which A and C clocks are to be interrupted. The shift registers continue to transfer data in the time slot occupied by the old call. However, the auxiliary control memory does not contain an entry to handle this data. Therefore, the time slot counter is interrupted (Clock) for this time slot and the A clock is also interrupted so that no transaction with a bilateral crosspoint store will take place. That is, though the bit is available to be read out during this time, no means for accepting it is provided. Thus, the signal is effectively destroyed. Transactions are resumed in the succeeding time slot. Normal output will be taken from the bilateral crosspoint store involved in the old call for all subsequent time slots. Extended output will be used otherwise for this bilateral crosspoint store and for all other such crosspoint stores on the link.

When CA=110 (at the start of the next frame) operation will be as just described for CA=101 except that the A and C clock will not be interrupted. Note that in this frame the reversible shift registers 501 and 503 in FIG. 12 now contain shortened frames, but the shift registers 502 and 504 contain unaltered frames. Thus the last "absorbing" operation must be repeated, but without interruption of the A and C clocks.

At the start of the next frame CA=100 and operation is as described for the corresponding 100 state during the call setup sequence.

Note that any two (or more) bilateral crosspoint stores on a given highway can be altered in a call release operation, but a given crosspoint store can absorb only one alteration. Thus intraconcentrator and intraswitch call release is provided for to the same extent as for call setup as discussed above.

Now we will consider the call release procedures for the bilateral time slot interchanger shown in FIG. 14. While CA′=000 operation is normal as described for the call setup procedures. When CA′=001, one frame after CA=101, then shift registers 601 and 604 are each presented with altered (shortened) frames. However, flip-flops 603-1 through **603-*n* and shift registers 602 and 605 both contain unaltered frames. Thus shift registers 602 and 605 must each absorb a bit under the control of the contents of the auxiliary control memory. As noted previously, the A1 clock is interrupted during time slots $\tau_1$, $\tau_2$. Flip-flops 603-1 through 603-*n* load from shift register 601 and dump to shift register 603 during $\tau_1$. A3 clock is interrupted during $\tau_1$ but not during $\tau_2$. This causes shift register 605 and shift register 602** each to advance one position to load their respective extender.

The two extra auxiliary control memory bits per time slot select, as before, the normal or extended output from shift registers 602 and 605. In each case, extended output is used until the bit to be absorbed arrives at the extender. Normal output is used for subsequent time slots. (It is not necessary to interrupt C clock. At the end of this frame, shift registers 601 and 604 contain altered frames but shift register 605 and flip-flops 603-1 through **603-*n*** hold unaltered frames.

At the start of the next frame CA′=110. The decoder operates on data received from the auxiliary control memory. During $\tau_1$, flip-flops 603-1 through **603-*n*** receive an *altered* frome from shift register 601 and deliver an *unaltered* frome to shift register 602. Shift registers 605 and 602 each advance during $\tau_2$ and load their respective extenders. Again the two extra bits from the auxiliary control memory determine for normal or extended operation of shift registers 602 and 605. Normal output is begun after the bit to be absorbed has entered the extender; before this time the extender output is used. At the end of this frame all shift registers and flip-flops 603-1 through **603-*n*** will hold altered frames.

At the start of the next frame CA′=100. The now well-defined continuity testing plan ensues. Also, the alternatives available upon positive and negative results being obtained remain as in the previously described setup procedures.

From the above description it is clear that the switching network experiences several different states while operating in the NORMAL and SETUP/RELEASE modes. Thus while in the NORMAL mode the control memory is used and all frames contain the same (old) number of active time slots. During setup or release operations the auxiliary memory is the primary source of control signals for establishing at least two transient states: (1) that for which some data frames have a first (old) number of time slots while other data frames have a second (new, whether smaller or larger) number of time slots and (2) that for which all data frames have the same (new) number of time slots. Finally, after call setup or release is complete, control is returned to the (updated) main control memory and the NORMAL state of operation is renamed.

It can be seen from the above detailed description than an improved switching system has been developed which includes bilateral crosspoint stores and time slot interchangers interconnected in a fashion which permits greater apparatus efficiencies to be realized while simplifying error-free call setup and release procedures to be carried forth.

It should be understood, of course, that the apparatus configurations disclosed are merely typical. Numerous and varied other arrangements within the spirit and scope of the appended claims will occur to those skilled in the art. Thus, for example, although single-bit "extenders" were shown in various of the circuits, it is clear that multiple-bit extenders will in some cases prove to be useful or advantageous. Similarly, though shift registers and flip-flops have been used as examples of circuit elements in the detailed circuits presented herein, other equivalent circuit elements may be used to implement these and other disclosed circuit functions. Mention should again be made of the merely typical choice for time slot (1-bit) and frame parameters.

Although the time slot interchangers described above were considered to interconnect individual unilateral or bilateral transmission paths, it is clear that a two-dimensional array of such time slot interchangers may be used to combine a spatial switching capability with the basic time slot interchange function. Similarly, it should be recalled that there is no necessary physical relationship between highways interconnected by time slot interchangers, e.g., these highways need not be adjacent.

It will be recognized that many of the pulse stuffing and absorbing techniques described above will find application in other than the time division switching network described herein. In particular, systems having variable length transmission words (here frames with a variable number of active time slots) will find use for the selective extension of storage media as described herein.

What is claimed is:

1. A time division multiplex switching system comprising

A. at least one array of bilateral crosspoint switching elements, each of said arrays having a plurality of rows and a plurality of columns, B. a first plurality of bidirectional highways connected to respective rows of each of said switching arrays, and a second plurality of bidirectional highways connected to respective columns of each of said switching arrays, C. means interconnecting individual ones of said second plurality of highways for a given array to individual ones of said first plurality of highways for others of said arrays, and D. a plurality of bidirectional time slot interchangers for effecting first time slot interchanges for signals arriving in the input direction on each bidirectional highway connected to one of the rows or columns of at least one of said switching arrays, and second time slot interchanges, complementary to said first time slot interchanges, for signals in the associated output direction on each bidirectional highway connected to said row or column of said switching arrays.

2. Apparatus according to claim 1 wherein each of said crosspoint switching elements comprises a first serial storage means for receiving and storing signals from a row highway during a given time frame and delivering said signals to a selected column highway in a subsequent time frame.

3. Apparatus according to claim 2 wherein said crosspoint switching elements each further comprises a second serial storage means for receiving and storing signals from a column highway during a given time frame and delivering said signals to a selected row highway in a subsequent time frame.

4. Apparatus according to claim 3 wherein said crosspoint switching elements each further comprises an extender circuit having input and output terminals for selectively delaying the delivery of signals from said first and second serial storage means to their respective column and row highways.

5. Apparatus according to claim 4 wherein said first and second serial storage means comprise respective first and second reversible shift registers, each having at least one input/output terminal and wherein each of said crosspoint switching elements further comprises means for alternately conditionally connecting said input/output terminals of said shift registers to said input terminal of said extender.

6. Apparatus according to claim 5 wherein said means for conditionally connecting comprises gate means responsive to applied control signals.

7. Apparatus according to claim 6 further comprising a source of control signals representative of the desired operational condition of said crosspoint switching elements.

8. Apparatus according to claim 7 wherein said source of control signals comprises first and second control memories adapted to store signals, and means for reading signals from said first memory when customer requests for service are in a static condition, and for reading signals from said second memory when it is desired to set up or release interconnections of said row highways to said column highways in response to changing demands for customer service.

9. Apparatus according to claim 1 wherein each of said time slot interchangers comprises a first serial storage means for receiving and storing signals from a row or column highway during a given time frame and delivering said signals to a selected row or column highway in a subsequent time frame.

10. Apparatus according to claim 9 wherein said time slot interchangers each further comprises a second serial storage means for receiving and storing signals from a row or column highway during a given time frame and delivering said signals to a selected row or column highway in a subsequent time frame.

11. Apparatus according to claim 10 wherein said time slot interchangers each further comprises first and second extender circuits, each xtender circuit having input and output terminals for selectively delaying the delivery of signals from said first and second serial storage means, respectively, to their respective output highways.

12. Apparatus according to claim 11 wherein said first and second serial storage means each have an output terminal and wherein said time slot interchangers each further comprises means for conditionally connecting said output terminals of said serial storage means to said input terminal of said first and second extenders respectively.

13. Apparatus according to claim 12 wherein said means for conditionally connecting comprises gate means responsive to applied control signals.

14. Apparatus according to claim 13 further comprising a source of control signals representative of the desired operational condition of said time slot interchangers.

15. Apparatus according to claim 14 wherein said source of control signals comprises first and second control memories adapted to store signals, and means for reading signals from said first memory when customer requests for service are in a static condition, and for reading signals from said second memory when it is desired to set up or release interconnections of said row highways to said column highways in response to changing demands for customer service.

16. Apparatus according to claim 4 wherein said time slot interchangers each further comprises first and second serial storage means for receiving and storing signals from respective row and column input highways during a given time frame and delivering said signals to selected respective column and row output highways in a subsequent time frame.

17. Apparatus according to claim 16 wherein said time slot interchangers each further comprise first and second extender circuits for selectively delaying the delivery of signals from said first and second serial storage means to said selected respective column and row output highways.

* * * * *